United States Patent
Sakurai et al.

(10) Patent No.: US 10,464,024 B2
(45) Date of Patent: Nov. 5, 2019

(54) WATER TREATMENT DEVICE AND OPERATING METHOD FOR WATER TREATMENT DEVICE

(71) Applicant: MITSUBISHI HEAVY INDUSTRIES, LTD., Tokyo (JP)

(72) Inventors: Hideaki Sakurai, Tokyo (JP); Hideo Suzuki, Tokyo (JP); Hiroshi Nakashoji, Tokyo (JP); Shigeru Yoshioka, Tokyo (JP); Susumu Okino, Tokyo (JP); Noriaki Senba, Tokyo (JP); Shigehiro Sugiyama, Tokyo (JP); Masayuki Eda, Tokyo (JP); Hyota Abe, Tokyo (JP); Ryo Kamito, Tokyo (JP); Nobuyuki Ukai, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 0 days.

(21) Appl. No.: 15/502,883

(22) PCT Filed: Sep. 3, 2014

(86) PCT No.: PCT/JP2014/073237
§ 371 (c)(1),
(2) Date: Feb. 9, 2017

(87) PCT Pub. No.: WO2016/035175
PCT Pub. Date: Mar. 10, 2016

(65) Prior Publication Data
US 2017/0232395 A1 Aug. 17, 2017

(51) Int. Cl.
*B01D 65/02* (2006.01)
*B01D 65/10* (2006.01)
(Continued)

(52) U.S. Cl.
CPC ............ *B01D 65/02* (2013.01); *B01D 61/10* (2013.01); *B01D 61/12* (2013.01); *B01D 63/12* (2013.01);
(Continued)

(58) Field of Classification Search
None
See application file for complete search history.

(56) References Cited

U.S. PATENT DOCUMENTS 6,054,050 A * 4/2000 Dyke .................... B01D 61/04
210/639
8,404,119 B2 * 3/2013 Echizen ............... B01D 61/025
210/321.6
(Continued)

FOREIGN PATENT DOCUMENTS

CN 101646482 A 2/2010
JP 10-286445 A 10/1998
(Continued)

OTHER PUBLICATIONS

Translation of Written Opinion dated Nov. 25, 2014, issued in counterpart International Application No. PCT/JP2014/073237. (8 pages).
(Continued)

*Primary Examiner* — Ana M Fortuna
(74) *Attorney, Agent, or Firm* — Westerman, Hattori, Daniels & Adrian, LLP

(57) ABSTRACT

A water treatment device is provided with a separation membrane device having a separation membrane for concentrating dissolved components and dispersed components from water to be treated and obtaining permeated water; a first deposit detecting unit provided in a non-permeated water branch line branched from a non-permeated water line for discharging non-permeated water in which dissolved
(Continued)

components and dispersed components have been concentrated, using part of the non-permeated water that has branched off as a detection liquid, and having a first separation membrane for detection in which the detection liquid is separated into permeated water for detection and non-permeated water for detection; and first flow rate measuring devices for separated liquid for detection that measure the flow rates of one or both of the permeated water for detection and the non-permeated water for detection separated by the first separation membrane for detection.

21 Claims, 14 Drawing Sheets

(51) Int. Cl.
| | |
|---|---|
| *B01D 61/10* | (2006.01) |
| *B01D 63/12* | (2006.01) |
| *C02F 1/44* | (2006.01) |
| *B01D 61/12* | (2006.01) |
| *C02F 101/10* | (2006.01) |
| *C02F 103/02* | (2006.01) |
| *C02F 103/10* | (2006.01) |
| *B01D 61/02* | (2006.01) |
| *B01D 61/08* | (2006.01) |

(52) U.S. Cl.
CPC .............. *B01D 65/10* (2013.01); *C02F 1/441* (2013.01); *B01D 61/025* (2013.01); *B01D 61/08* (2013.01); *B01D 2317/022* (2013.01); *B01D 2321/168* (2013.01); *C02F 2101/101* (2013.01); *C02F 2103/023* (2013.01); *C02F 2103/10* (2013.01); *C02F 2209/005* (2013.01); *C02F 2209/03* (2013.01); *C02F 2209/10* (2013.01); *C02F 2209/40* (2013.01); *C02F 2303/16* (2013.01); *C02F 2303/20* (2013.01)

(56) References Cited

U.S. PATENT DOCUMENTS

| | | | |
|---|---|---|---|
| 2002/0134716 A1* | 9/2002 | Maartens | B01D 61/12 210/97 |
| 2005/0067341 A1* | 3/2005 | Green | B01D 61/022 210/321.69 |
| 2009/0045144 A1 | 2/2009 | Cohen et al. | |
| 2010/0126935 A1 | 5/2010 | Echizen et al. | |
| 2011/0147285 A1* | 6/2011 | Bonnelye | B01D 61/025 210/134 |
| 2015/0114905 A1* | 4/2015 | Subbiah | B01D 61/12 210/636 |
| 2019/0118145 A1* | 4/2019 | Shimura | B01D 63/02 |

FOREIGN PATENT DOCUMENTS

| | | |
|---|---|---|
| JP | 2008-253953 A | 10/2008 |
| JP | 2009-524521 A | 7/2009 |
| JP | 2010-82546 A | 4/2010 |
| JP | 2012-130823 A | 7/2012 |
| JP | 5345344 B2 | 11/2013 |

OTHER PUBLICATIONS

International Search Report dated Nov. 25, 2014, issued in counterpart International Application No. PCT/JP2014/073237 (2 pages).
"Technical Manual", Dow Water Solutions "6.3 clearing Requirements" (http://dowac.custhelp.com/app/answers/detail/a_id/3428/kw/manual), updated Oct. 28, 2015, 7 pages.
Office Action dated Oct. 31, 2018, issued in counterpart Chinese Application No. 201480081210.6, with English translation. (12 pages).

* cited by examiner

WATER TREATMENT DEVICE AND OPERATING METHOD FOR WATER TREATMENT DEVICE

TECHNICAL FIELD

The present invention relates to a water treatment device and an operating method for a water treatment device.

BACKGROUND ART

For example, mining wastewater contains pyrite ($FeS_2$), and, when this pyrite is oxidized, $SO_4^{2-}$ is generated. In order to neutralize mining wastewater, inexpensive $Ca(OH)_2$ is used. Therefore, mining wastewater contains a rich amount of $Ca^{2+}$ and $SO_4^{2-}$.

In addition, it is known that brine water, sewage water, and industrial wastewater also contain a rich amount of $Ca^{2+}$ and $SO_4^{2-}$. In addition, in cooling towers, heat exchange occurs between high-temperature exhaust gas discharged from boilers and the like and cooling water. Since some of cooling water turns into vapor due to this heat exchange, ions are concentrated in cooling water. Therefore, cooling water discharged from cooling towers (blow-down water) is in a state in which the ion concentrations of $Ca^{2+}$, $SO_4^{2-}$, and the like are high.

Water containing a large amount of these ions is subjected to a desalination treatment. As a concentration device for carrying out the desalination treatment, for example, reverse osmosis membrane devices, nanofiltration membrane devices, ion-exchange membrane devices, and the like are known.

However, in a case in which the desalination treatment is carried out using the above-described devices, if a high concentration of a cation (for example, a calcium ion ($Ca^{2+}$)) and an anion (for example, a sulfate ion ($SO_4^{2-}$)) concentrate on membrane surfaces when fresh water is obtained, there are cases in which the concentration of the ions exceeds the solubility limit of calcium sulfate (gypsum ($CaSO_4$)) which is a poorly-soluble mineral salt, and there is a problem in that the ions are precipitated on membrane surfaces as deposits and the permeation rate (flux) of permeated water decreases.

Therefore, in the related art, as monitoring methods for reverse osmosis membranes, for example, a method in which the generation of the crystals of mineral salts is detected by means of visual determination using cells for monitoring reverse osmosis membranes in reverse osmosis membrane devices has been proposed (PTL 1).

In addition, a method in which at least part of concentrated water from a water conversion device is permeated through a separation membrane for monitoring and the precipitation of deposits included in the concentrated water on the membrane surfaces of the separation membrane for monitoring is monitored using pressure meters provided before and after the separation membrane for monitoring has been proposed (PTL 2). This proposal enables the early monitoring of the precipitation of deposits on the membrane surfaces of filtration membranes caused by the concentration of raw water (seawater) and the efficient suppression of the precipitation of deposits on the membrane surfaces of filtration membranes in water conversion devices.

In addition, PTL 2 has also proposed the supply of an alkaline medicine to concentrated water being supplied to the separation membrane for monitoring in order to promote the precipitation of deposits.

Furthermore, in the technical manuals of reverse osmosis membrane devices, there are cases in which the membrane surfaces of RO elements are contaminated by mineral scale, microbes, colloidal particles, and organic substances during the operation of reverse osmosis membrane devices, sediment is deposited on the membrane surfaces, and finally, it becomes impossible to obtain predetermined permeated water flow rates and predetermined desalination percentages. There has been a proposal in which elements need to be washed in a case in which the standardized permeated water flow rate decreases by 10% or more, a case in which the standardized saline component flow rate increases by 10% or more, or a case in which the standardized pressure difference (the pressure on the supplied water side–the pressure on the concentrated water side) increases by 15% or more during operation for the first 48 hours from the system initiation (NPL 1).

CITATION LIST

Patent Literature

[PTL 1] PCT Japanese Translation Patent Publication No. 2009-524521
[PTL 2] Japanese Unexamined Patent Application Publication No. 2012-130823

Non Patent Literature

[NPL 1] "Technical Manual" Dow Water Solutions "6.3 cleaning Requirements" (http://dowac.custhelp.com/app/answers/detail/a_id/3428/kw/manual)

SUMMARY OF INVENTION

Technical Problem

However, in the monitoring method proposed by PTL 1, the generation mechanism of deposits (for example, mineral salt crystals) is that nano-level crystal nuclei grow and turn into deposits. When the fine pore sizes on reverse osmosis membrane surfaces in reverse osmosis membrane devices are on nano-levels, and sub-micrometer or smaller deposits are present on membrane surfaces, reverse osmosis membranes are clogged. Regarding the visual confirmation of these sub-micrometer or smaller deposits, there is a problem in that it is substantially difficult to confirm deposits in images captured using optical imaging devices (for example, optical microscopes), imaging devices such as electron microscopes are required, and continuous observation is not possible.

Furthermore, on the surfaces of visually observable reverse osmosis membranes, concentrated water in reverse osmosis membrane devices flows, and thus there is a problem in that it is substantially difficult to continuously observe the surfaces of reverse osmosis membranes through the flowing liquid with a favorable accuracy.

In addition, in the proposal by PTL 2, since it is necessary to detect a pressure difference between before and after the cell for monitoring, there is a problem in that it is not possible to determine the precipitation of deposits until a large amount of the deposits are precipitated and thus flow channels are clogged with the deposits and the pressure difference changes. In addition, in order to detect deposits, devices for monitoring having a certain size, for example, a size being approximately as large as filtration membranes in water conversion devices for raw water are required, and thus there is a problem in that monitoring devices become large.

That is, regarding a reverse osmosis membrane in a water conversion device, in a case in which one vessel for filtration is constituted by, for example, storing a plurality (for example, five to eight) of one meter-long spiral membranes and the filtration of raw water is carried out by linking several hundreds of vessels, the compactization of monitoring devices contributes to the compactization of water conversion facilities, and thus there is a desire for the emergence of monitoring devices for deposits which are capable of becoming as compact as possible.

In addition, in a case in which an alkaline medicine is supplied, the supply of the alkaline medicine is effective for deposit components which become easily precipitated due to the supply of the alkaline medicine (for example, calcium carbonate, magnesium hydroxide, and the like), but is not effective for components that do not depend on the pH (for example, gypsum ($CaSO_4$), calcium fluoride ($CaF_2$), and the like), and thus there is a problem in that it is not possible to apply the supply of the alkaline medicine to concentrated water.

NPL 1 describes that elements need to be washed in a case in which the permeated water flow rate in reverse osmosis membrane devices decreases by 10% or more. Generally, in reverse osmosis membrane devices, for example, five to eight elements are coupled together in series in a pressure container (vessel), and, in addition, in a case in which two pressure containers (vessels) are coupled together, for example, 10 to 16 elements are coupled together in series. Here, the length of one element in the liquid flow direction is, for example, 1 m, and in a case in which, for example, eight elements are coupled together in series, the total length of the membrane in the liquid flow direction reaches, for example, 16 m. In a case in which the permeated water flow rate decreases by 10% in such a status, scale is precipitated in the elements in quite a long length in the liquid flow direction, the scale deposition amount is also great, and it becomes difficult to remove scale by means of washing.

In addition, due to the scale precipitation in reverse osmosis membranes, the reverse osmosis membranes are damaged, and the performance degradation of the membranes is caused. Therefore, in order to easily wash the deposited scale, devices capable of detecting the timing at which scale begins to be precipitated in reverse osmosis membranes with a high sensitivity.

The present invention has been made in consideration of the above-described problems, and an object of the present invention is to provide a water treatment device capable of detecting the deposition initiation timing of deposits not only in reverse osmosis membranes in reverse osmosis membrane devices but also in separation membranes in separation membrane devices using a compact device and an operating method for a water treatment device.

Solution to Problem

A first invention for achieving the above-described object is a water treatment device being provided with: a separation membrane device having a separation membrane for concentrating dissolved components and dispersed components from water to be treated and obtaining permeated water; a first deposit detecting unit provided in a non-permeated water branch line branched from a non-permeated water line for discharging non-permeated water in which dissolved components and dispersed components have been concentrated, using part of the non-permeated water that has branched off as a detection liquid, and having a first separation membrane for detection in which the detection liquid is separated into permeated water for detection and non-permeated water for detection; and first flow rate measuring devices for separated liquid for detection that measure the flow rates of one or both of the permeated water for detection and the non-permeated water for detection separated by the first separation membrane for detection.

A second invention is a water treatment device being provided with: a separation membrane device having a separation membrane for concentrating dissolved components and dispersed components from water to be treated and obtaining permeated water; a second deposit detecting unit provided in a water to be treated branch line branched from a water to be treated supply line for supplying the water to be treated, using part of the water to be treated that has branched off as a detection liquid, and having a second separation membrane for detection in which the detection liquid is separated into permeated water for detection and non-permeated water for detection; and second flow rate measuring devices for separated liquid for detection that measure the flow rates of one or both of the permeated water for detection and the non-permeated water for detection separated by the second separation membrane for detection.

A third invention for achieving the above-described object is a water treatment device being provided with: a separation membrane device having a separation membrane for concentrating dissolved components and dispersed components from water to be treated and obtaining permeated water; a first deposit detecting unit provided in a non-permeated water branch line branched from a non-permeated water line for discharging non-permeated water in which dissolved components and dispersed components have been concentrated, using part of the non-permeated water that has branched off as a detection liquid, and having a first separation membrane for detection in which the detection liquid is separated into permeated water for detection and non-permeated water for detection; first flow rate measuring devices for separated liquid for detection that measure the flow rates of separated liquids separated by the first separation membrane for detection; a second deposit detecting unit provided in a water to be treated branch line branched from a water to be treated supply line for supplying the water to be treated, using part of the water to be treated that has branched off as a detection liquid, and having a second separation membrane for detection in which the detection liquid is separated into permeated water for detection and non-permeated water for detection; and second flow rate measuring devices for separated liquid for detection that measure the flow rates of separated liquids separated by the second separation membrane for detection.

A fourth invention is the water treatment device according to any one of the first to third inventions, being further provided with a control device for carrying out washing on the separation membrane in the separation membrane device on the basis of a result of measurement of the first flow rate measuring devices for separated liquid for detection or the second flow rate measuring devices for separated liquid for detection.

A fifth invention is the water treatment device according to the fourth invention, being further provided with a control device for carrying out a control for changing an operation condition to a condition under which deposits are not deposited in the separation membrane in the separation membrane device on the basis of a result of measurement of the first flow rate measuring device for separated liquid for detection or the second flow rate measuring device for separated liquid for detection.

A sixth invention is a water treatment device being provided with: a separation membrane device having a separation membrane for concentrating dissolved components and dispersed components from water to be treated and obtaining permeated water; a first deposit detecting unit provided in a non-permeated water branch line branched from the non-permeated water line for discharging non-permeated water in which dissolved components and dispersed components have been concentrated, using part of the non-permeated water that has branched off as a detection liquid, and having a first separation membrane for detection in which the detection liquid is separated into permeated water for detection and non-permeated water for detection; first flow rate measuring devices for separated liquid for detection that measure the flow rates of one or both of the permeated water for detection and the non-permeated water for detection separated by the first separation membrane for detection; and a control device for carrying out a control for changing an operation condition to a condition under which deposits are not deposited in the separation membrane in the separation membrane device on the basis of a result of measurement of the first flow rate measuring device for separated liquid for detection.

A seventh invention is a water treatment device being provided with: a separation membrane device having a separation membrane for concentrating dissolved components and dispersed components from water to be treated and obtaining permeated water; a second deposit detecting unit provided in a water to be treated branch line branched from a water to be treated supply line for supplying the water to be treated, using part of the water to be treated that has branched off as a detection liquid, and having a second separation membrane for detection in which the detection liquid is separated into permeated water for detection and non-permeated water for detection; second flow rate measuring devices for separated liquid for detection that measure the flow rates of one or both of the permeated water for detection and the non-permeated water for detection separated by the second separation membrane for detection; and a control device for carrying out a control for changing an operation condition to a condition under which deposits are not deposited in the separation membrane in the separation membrane device on the basis of a result of measurement of the second flow rate measuring device for separated liquid for detection.

An eighth invention for achieving the above-described object is a water treatment device being provided with: a separation membrane device having a separation membrane for concentrating dissolved components and dispersed components from water to be treated and obtaining permeated water; a first deposit detecting unit provided in a non-permeated water branch line branched from a non-permeated water line for discharging non-permeated water in which dissolved components and dispersed components have been concentrated, using part of the non-permeated water that has branched off as a detection liquid, and having a first separation membrane for detection in which the detection liquid is separated into permeated water for detection and non-permeated water for detection; a second deposit detecting unit provided in a water to be treated branch line branched from a water to be treated supply line for supplying the water to be treated, using part of the water to be treated that has branched off as a detection liquid, and having a second separation membrane for detection in which the detection liquid is separated into permeated water for detection and non-permeated water for detection; second flow rate measuring devices for separated liquid for detection that measure the flow rates of separated liquid separated by the second separation membrane for detection; and a control device for carrying out a control for changing an operation condition to a condition under which deposits are not deposited in the separation membrane in the separation membrane device on the basis of a result of measurement of the first flow rate measuring device for separated liquid for detection or the second flow rate measuring device for separated liquid for detection.

A ninth invention is the water the water treatment device according to any one of the first to eighth inventions, in which, in a case in which a flow rate of permeated water for detection that has permeated the first separation membrane for detection or the second separation membrane for detection is measured using a flow rate measuring device for permeated water, in a case in which the measured flow rate reaches a predetermined threshold value or lower, it is determined as an initial stage of deposit deposition in the separation membrane in the separation membrane device.

A tenth invention is the water the water treatment device according to any one of the first to eighth inventions, in which, in a case in which a flow rate of non-permeated water for detection that has permeated the first separation membrane for detection or the second separation membrane for detection is measured using a flow rate measuring device for non-permeated water, in a case in which the measured flow rate reaches a predetermined threshold value or higher, it is determined as an initial stage of deposit deposition in the separation membrane in the separation membrane device.

An eleventh invention is the water treatment device according to the first, third, sixth, or eighth invention, in which a length of a flow channel in the first deposit detecting unit is $\frac{1}{10}$ or less of a total length in a supply liquid flow direction of the separation membrane being used in the separation membrane device.

A twelfth invention is the water treatment device according to the second, third, seventh, or eighth invention, in which a length of a flow channel in the second deposit detecting unit is $\frac{1}{10}$ or less of a total length in a supply liquid flow direction of the separation membrane being used in the separation membrane device.

A thirteenth invention is the water treatment device according to any one of the first to twelfth inventions, being further provided with: an evaporator that evaporates moisture of the non-permeated water from the separation membrane device.

A fourteenth invention is an operating method for a water treatment device, including: selecting one or both of a deposit washing liquid for washing deposits deposited in the first separation membrane for detection in the first deposit detecting unit and a deposit retarder for retarding deposition of deposits; and supplying this selected deposit washing liquid or deposit retarder to the separation membrane device in a case in which a flow rate of the separated liquid is changed from a predetermined threshold value using the first deposit detecting unit in the water treatment device according to the first invention.

A fifteenth invention is an operating method for a water treatment device, including: selecting one or both of a deposit washing liquid for washing deposits deposited in the second separation membrane for detection in the second deposit detecting unit and a deposit retarder for retarding deposition of deposits; and supplying this selected deposit washing liquid or deposit retarder to the separation membrane device in a case in which a flow rate of the separated liquid is changed from a predetermined threshold value using the second deposit detecting unit in the water treatment device according to the second invention.

A sixteenth invention is the operating method for a water treatment device according to the fourteenth or fifteenth invention, in which moisture of the non-permeated water from the separation membrane device is evaporated.

Advantageous Effects of Invention

When the water treatment device of the present invention is used, in a case in which water to be treated is treated using a separation membrane device having a separation membrane, it is possible to detect the deposition initiation timing of deposits in the separation membrane.

DESCRIPTION OF EMBODIMENTS

Preferred examples of the present invention will be described in detail with reference to the accompanying drawings. Meanwhile, these examples do not limit the present invention, and, in a case in which a plurality of examples are provided, the scope of the present invention includes constitutions obtained by constituting the respective examples.

Example 1

Figure 1:
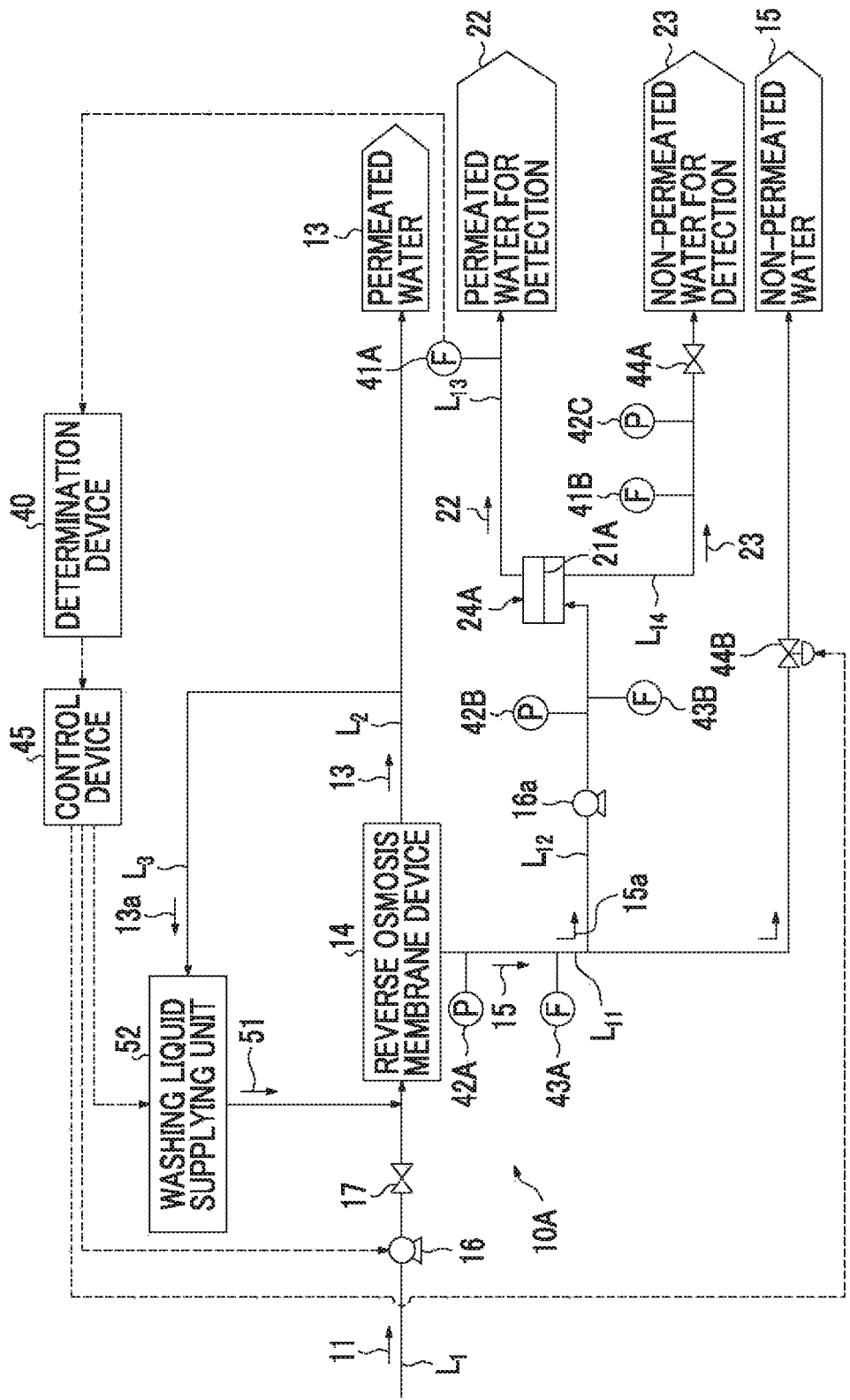
FIG. 1 is a schematic view of a desalination treatment device according to Example 1.
Figure 2:
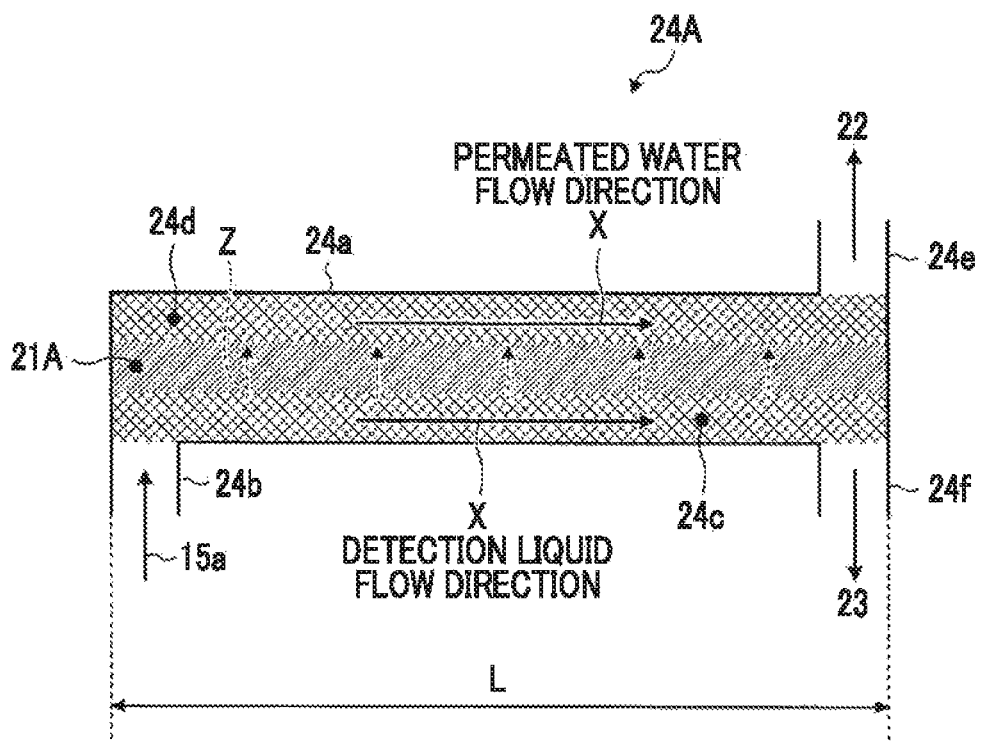
FIG. 2 is a schematic view of a first deposit detecting unit according to Example 1.

FIG. 1 is a schematic view of a desalination treatment device according to Example 1. FIG. 2 is a schematic view of a first deposit detecting unit according to Example 1. In the following example, a reverse osmosis membrane device which is a separation membrane device using a reverse osmosis membrane as a separation membrane will be exemplified, and, for example, a desalination treatment device for desalinating dissolved components such as a saline matter will be described, but the present invention is not limited thereto as long as a subject device is a water treatment device for treating water using a separation membrane.

As illustrated in FIG. 1, a desalination treatment device 10A according to the present example is provided with a reverse osmosis membrane device 14 concentrating dissolved components containing ions or organic substances (also referred to as "deposited components") from water to be treated 11 and having a reverse osmosis membrane for obtaining permeated water, a first deposit detecting unit 24A provided in a non-permeated water branch line $L_{12}$ branched from a non-permeated water line $L_{11}$ for discharging non-permeated water 15 in which the dissolved components containing ions or organic substances are concentrated, using part of the non-permeated water 15 that has branched off as a detection liquid 15a, and having a first reverse osmosis membrane for detection 21A for separating the detection liquid 15a into permeated water for detection 22 and non-permeated water for detection 23, first flow rate measuring devices for separated liquid for detection (a first flow rate measuring device for permeated water for detection 41A and a first flow rate measuring device for non-permeated water for detection 41B) that measure a flow rate of the permeated water for detection 22 or the non-permeated water for detection 23 which is a separated liquid separated by the first reverse osmosis membrane for detection 21A, and a determination device 40 for determining a deposition initial stage of deposits in the reverse osmosis membrane in the reverse osmosis membrane device 14 in a case in which a measured flow rate changes from a predetermined threshold value as a result of measurement of the first flow rate measuring devices for separated liquid for detection (the first flow rate measuring device for permeated water for detection 41A and the first flow rate measuring device for non-permeated water for detection 41B). Meanwhile, in the present example, the determination device 40 is provided, but the determination device 40 may be installed as necessary.

Here, the reverse osmosis membrane device 14 is a device for producing the permeated water 13 from the water to be treated 11 and thus, hereinafter, will also be referred to as "basic design reverse osmosis membrane device" in some cases.

Meanwhile, in FIG. 1, reference sign 16 represents a high-pressure pump for supplying the water to be treated 11 to the reverse osmosis membrane device 14, 17 represents an adjusting valve, $L_1$ represents a water to be treated supply line, $L_2$ represents a permeated water discharge line, and $L_3$ represents a permeated water supply line, respectively.

In the present example, the first deposit detecting unit 24A having a smaller size than the reverse osmosis membrane in the basic design reverse osmosis membrane device 14 is provided in a non-permeated water branch line $L_{12}$ branched from a non-permeated water line $L_{11}$ from the basic design reverse osmosis membrane device 14, the desalination condition in the first deposit detecting unit 24A is adjusted so as to become identical to that near an outlet of the reverse osmosis membrane in the basic design reverse osmosis membrane device 14, the non-permeated water side flow rate and pressure of the membrane in the final desalination part of the basic design reverse osmosis membrane device 14 are simulated, and the deposit deposition initiation timing is learned in the first reverse osmosis membrane for detection 21A. Therefore, it becomes possible to carry out a washing treatment immediately after the deposition of deposits in the reverse osmosis membrane in the basic design reverse osmosis membrane device 14.

Here, as separated liquids separated by the first reverse osmosis membrane for detection 21A, there are permeated water for detection 22 permeating the first reverse osmosis membrane for detection 21A and non-permeated water for detection 23 not permeating the first reverse osmosis membrane for detection 21A. In the present example, as the first flow rate measuring devices for separated liquid for detection, the first flow rate measuring device for permeated water for detection 41A for measuring the flow rate of the permeated water for detection 22 is provided in a permeated water for detection discharge line $L_{13}$, and the first flow rate measuring device for non-permeated water for detection 41B for measuring the flow rate of the non-permeated water for detection 23 is provided in a non-permeated water for detection discharge line $L_{14}$.

Meanwhile, as the measuring method for the flow rates using the flow rate measuring devices, the flow rates may be directly measured using a flow instrument, or the flow rates may be indirectly measured by means of a weight measurement using, for example, an electronic weighing machine. In the following example, an example in which a flow instrument is used as the flow rate measuring device will be described.

In addition, the flow rates of one or both of the permeated water for detection 22 and the non-permeated water for detection 23 are measured using the first flow rate measuring device for permeated water for detection 41A and the first flow rate measuring device for non-permeated water for detection 41B.

Here, the total of the flow rates of the permeated water for detection 22 and the non-permeated water for detection 23 is the flow rate of the detection liquid 15a being supplied to the first deposit detecting unit 24A, and thus the flow rate of the permeated water for detection 22 may be indirectly obtained from that of the non-permeated water 23. In the following description, a case in which the flow rate of the non-permeated water for detection 22 is measured using the first flow rate measuring device for permeated water for detection 41A will be mainly described.

Here, the water to be treated 11 contains deposits or components generating deposits of ions of, for example, organic substances, microbes, mineral salts, and the like from, for example, mining wastewater, blow-down water from cooling towers in power generation plants, produced water during oil and gas extraction, brine water, and industrial wastewater. In addition, it is also possible to use seawater as the water to be treated 11 and apply the seawater to seawater conversion.

Examples of the separation membrane for separating dissolved components, for example, a saline matter from the water to be treated 11 include, in addition to reverse osmosis membranes (RO), nanofiltration membranes (NF) and forward osmosis membrane (FO).

Here, in a case in which the separation membrane is changed to a membrane other than the reverse osmosis membrane, it is possible to change the separation membrane for detection in the same manner and carry out detection.

The water to be treated 11 is pressurized to a predetermined pressure by handling the high-pressure pump 16 provided in the water to be treated supply line $L_1$ and an adjusting valve 44B for adjusting the flow rate provided in the non-permeated water discharge line $L_{11}$ from the reverse osmosis membrane device 14 and is introduced into the reverse osmosis membrane device 14 provided with the reverse osmosis membrane.

In addition, examples of the deposits deposited in the reverse osmosis membrane include inorganic deposits such as calcium carbonate, magnesium hydroxide, calcium sulfate, and silicate, natural organic substances and microbe-derived organic deposits, and colloidal components such as silica, and dispersed components containing an emulsion such as oil, but the deposits are not limited thereto as long as substances can be deposited in membranes.

In the reverse osmosis membrane device 14, the water to be treated 11 is desalinated by the reverse osmosis membrane in the reverse osmosis membrane device 14, thereby obtaining the permeated water 13. In addition, the non-permeated water 15 in which the dissolved components containing ions or organic substances are concentrated by the reverse osmosis membrane is appropriately disposed of or treated as waste or is used to collect valuables in the non-permeated water 15.

In the present example, the non-permeated water branch line $L_{12}$ for branching part of the non-permeated water from the non-permeated water line $L_{11}$ for discharging the non-permeated water 15 is provided.

In addition, the first deposit detecting unit 24A having the first reverse osmosis membrane for detection 21A for separating the detection liquid 15a that has branched off into the permeated water for detection 22 and the non-permeated water for detection 23 is installed in the non-permeated water branch line $L_{12}$.

The high-pressure pump 16a is provided on the front flow side of the first deposit detecting unit 24A in the non-permeated water branch line $L_{12}$, an adjusting valve 44A for adjusting the flow rate is provided in the non-permeated water for detection discharge line $L_{14}$ from the first deposit detecting unit 24A, and the flow rate of the permeated water for detection 22 from the first deposit detecting unit 24A is adjusted by handling the high-pressure pump 16a and the adjusting valve 44A. In addition, the pressure and the flow rate of the detection liquid 15a that has branched off are adjusted so that the desalination condition of the first deposit detecting unit 24A become identical to the desalination condition near the outlet of the reverse osmosis membrane in the basic design reverse osmosis membrane device 14. The predetermined pressure and flow rate are monitored using pressure meters 42A and 42B and flow instruments 43A and 43B.

Furthermore, the flow rate of the permeated water for detection 22 from the first deposit detecting unit 24A may be adjusted using any one of the adjusting valve 44A and the high-pressure pump 16a.

Meanwhile, a pressure meter 42C is provided in the non-permeated water for detection discharge line $L_{14}$ for discharging the non-permeated water for detection 23, and the adjusting valve 44B is provided in the non-permeated water line $L_{11}$ for the non-permeated water 15, respectively.

Figure 3:
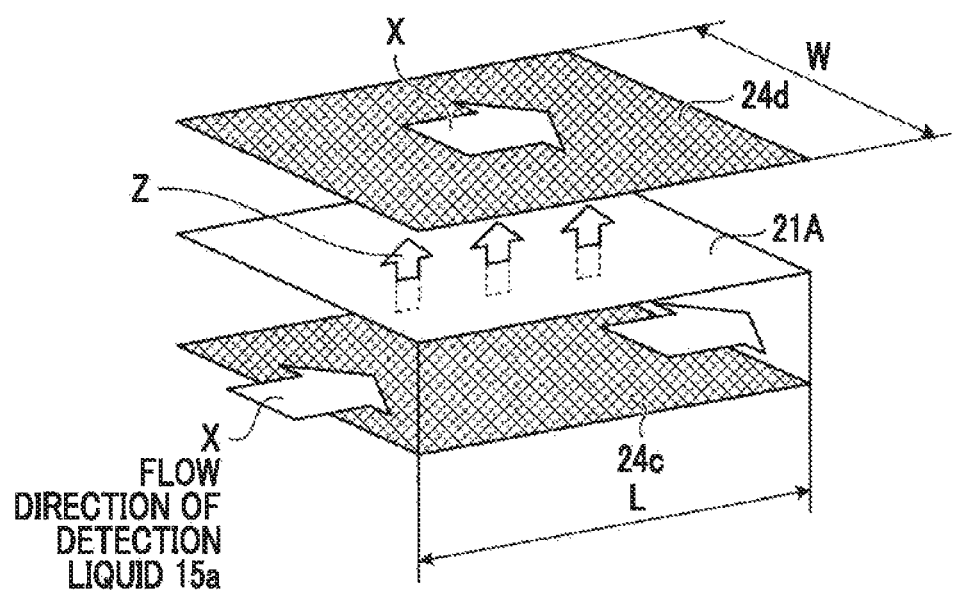
FIG. 3 is a perspective view of the first deposit detecting unit in FIG. 2.

FIG. 3 is a perspective view of the first deposit detecting unit in FIG. 2.

As illustrated in FIGS. 2 and 3, the first deposit detecting unit 24A is a member for introducing the detection liquid 15a that has branched off from an inlet 24b side of a detecting unit main body 24a, and the first reverse osmosis membrane for detection 21A is sandwiched by a spacer (non-permeating side) 24c and a spacer (permeating side) 24d. In addition, the introduced detection liquid 15a flows along the first reverse osmosis membrane for detection 21A (X direction). In addition, this detection liquid 15a moves in a direction (Z direction) perpendicular to the detection liquid flow direction (X direction), passes through the first reverse osmosis membrane for detection 21A, and is desalinated, thereby obtaining the permeated water for detection 22. The permeated water for detection 22 that has been permeated forms the permeated water flow (X direction) which runs along the first reverse osmosis membrane for detection 21A and is discharged from a permeated water outlet 24e as the permeated water for detection 22.

In FIG. 3, the length (L) of the detection liquid 15a in the flow direction (X direction) is the length of a flow channel in the first deposit detecting unit 24A, and the length of the first deposit detecting unit 24 in the depth direction in FIG. 2 reaches W.

Figure 4:
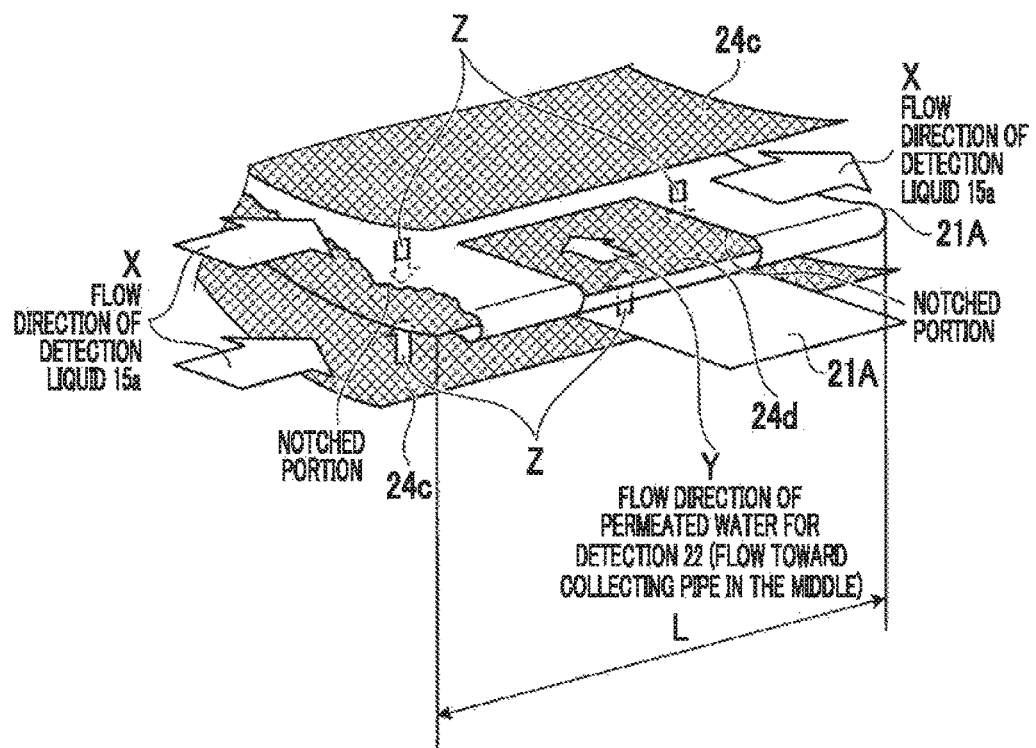
FIG. 4 is a partially-notched perspective view of a case in which a spiral reverse osmosis membrane is used in the first deposit detecting unit.

FIG. 4 is a partially-notched perspective view of a case in which a spiral reverse osmosis membrane is used in the first deposit detecting unit. As illustrated in FIG. 4, a spiral first reverse osmosis membrane for detection 21A is used as the membrane for detection in the first deposit detecting unit 24A, the detection liquid 15a is supplied from both surfaces of the first reverse osmosis membrane for detection 21A, the first reverse osmosis membrane for detection 21A is moved in a direction (Z direction) perpendicular to the flow direction of the detection liquid 15a, and the detection liquid passes through the membrane and is thus desalinated and turns into the permeated water for detection 22. In addition, since the spiral reverse osmosis membrane is used, the permeated water for detection 22 flows toward a collecting pipe in the center (in a Y direction). Meanwhile, in FIG. 4, a notched portion illustrates a state of the spiral reverse osmosis membrane 21 being cut open, and the spacer (permeating side) 24d inside the spiral reverse osmosis membrane is illustrated.

In this first deposit detecting unit 24A, for example, the resin spacer (non-permeating side) 24c is provided in order to ensure a flow channel forming a uniform flow (in the detection liquid flow direction (the X direction)) from the inlet 24b through a non-permeated water outlet 24f. In addition, on the permeated water side as well, similarly, for example, the resin spacer (permeating side) 24d is provided in order to ensure a flow channel forming a uniform flow (in the permeated water flow direction (the X direction)) through the permeated water outlet 24e. Here, the member provided is not limited to spacers as long as the member is capable of ensuring a uniform flow.

In addition, the length (L) of the flow channel in the first deposit detecting unit 24A is preferably set to approximately 1/10 or shorter of the total length of the reverse osmosis membrane in the reverse osmosis membrane device 14, which is used in the basic design reverse osmosis membrane device 14, in the flow direction of the supplied liquid, more preferably set to 1/50 or shorter of the length, and still more preferably set to 1/100 or shorter of the length. Meanwhile, in the first deposit detecting unit 24A used in test examples, flow channels having a length (L) of 16 mm or 1,000 mm were used.

Here, as described below, eight elements (having a length of, for example, 1 m) of the reverse osmosis membrane in the basic design reverse osmosis membrane device 14 are connected to each other and thus form one vessel. For example, in a case in which one vessel includes eight elements, when two vessels are connected to each other in series, the membrane length in the flow direction of the supplied liquid in the reverse osmosis membrane device 14 reaches 16 m, and, in a case in which a reverse osmosis membrane having a flow channel length of 1,000 mm is used as a detection membrane, the length of the flow channel in the first deposit detecting unit 24A reaches 1/16 (1/10 or shorter).

Similarly, in a case in which a 16 mm-long reverse osmosis membrane is used as the detection membrane, the length of the flow channel in the first deposit detecting unit 24A reaches 0.016/16 (1/100 or shorter).

In addition, when the length W in the depth direction (the direction perpendicular to the flow of the supplied water) of the first reverse osmosis membrane for detection 21A which is the detection membrane in the first deposit detecting unit 24A is set to be constant, as the membrane length (L) decreases, the film area decreases. In addition, "when 10% of the membrane surface is clogged due to the deposition of deposits, the permeated water flow rate decreases by 10%", and, as the membrane area decreases, the membrane is clogged early due to the deposition, and thus it becomes possible to rapidly detect a decrease of the permeated water flow rate with a high sensitivity.

Here, as the first reverse osmosis membrane for detection 21A in the first deposit detecting unit 24A, a separation membrane which exhibits a reverse osmosis action, is identical or similar to the reverse osmosis membrane in the basic design reverse osmosis membrane device 14, and exhibits a desalination performance is used.

In the present example, the reverse osmosis membrane in the basic design reverse osmosis membrane device 14 is a plurality of reverse osmosis membrane elements provided with a spiral reverse osmosis membrane stored in a pressure-resistant container.

Figure 5:
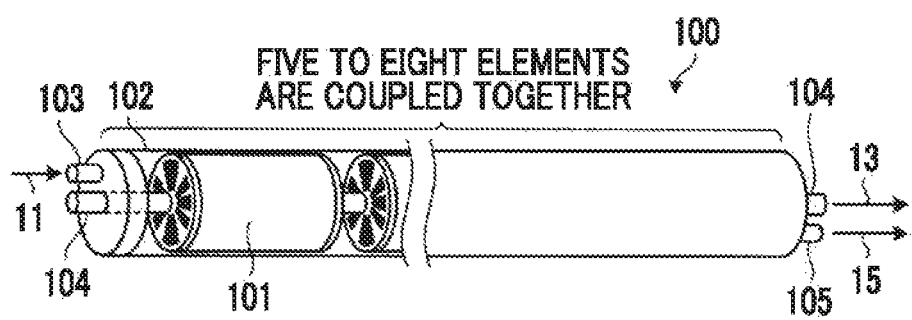
FIG. 5 is a partially-notched schematic view of a vessel in a spiral reverse osmosis membrane device.
Figure 6:
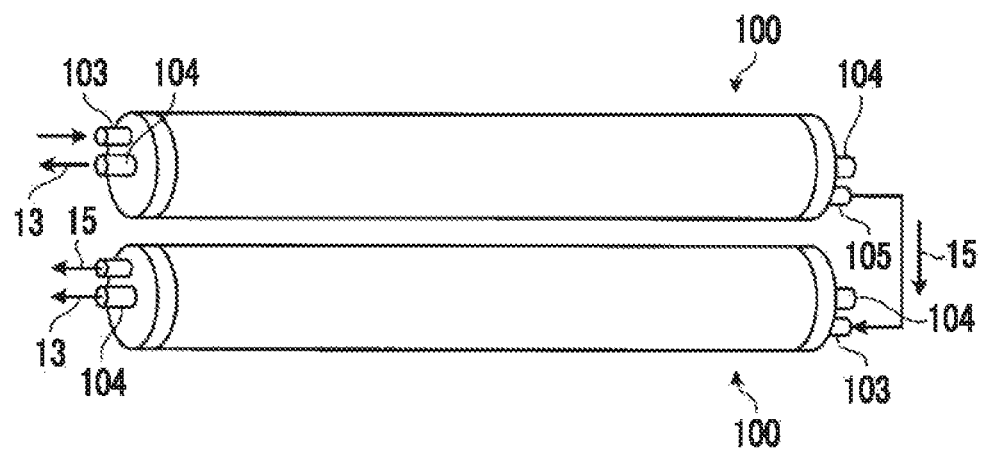
FIG. 6 is a perspective view of two vessel coupled together.
Figure 7:
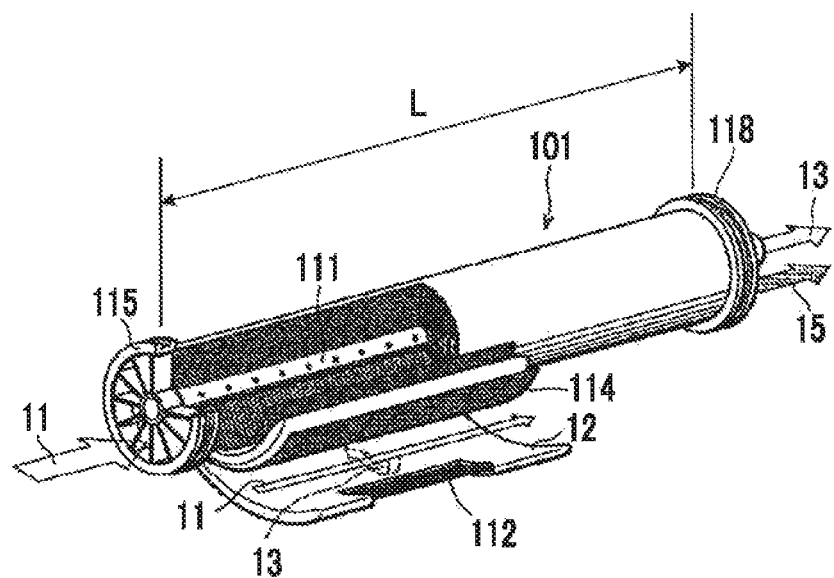
FIG. 7 is a schematic partially exploded view of an element.

Here, an example of the spiral reverse osmosis membrane will be described. FIG. 5 is a partially-notched schematic view of a vessel in a spiral reverse osmosis membrane device. FIG. 6 is a perspective view of two vessel in FIG. 5 coupled together. FIG. 7 is a schematic partially exploded view of the spiral reverse osmosis membrane element. The spiral reverse osmosis membrane element illustrated in FIG. 7 is an example disclosed by JP2001-137672A and is not limited thereto. Hereinafter, a vessel 100 in the reverse osmosis membrane device will be referred to as a vessel 100, and a spiral reverse osmosis membrane element 101 will be referred to as an element 101.

As illustrated in FIG. 5, the vessel 100 is constituted by storing a plurality (for example, five to eight) of the elements 101 connected to each other in series in a cylindrical container main body (hereinafter, referred to as "container main body") 102. The water to be treated 11 is introduced as raw water from a raw water supply opening 103 on one end side of the container main body 102, and the permeated water 13 and the non-permeated water 15 were ejected from a permeated water ejection opening 104 on the other end side and a non-permeated water ejection opening 105. Meanwhile, in FIG. 5, the permeated water ejection opening 104 on the water to be treated 11 introduction side is in a state of being clogged.

FIG. 6 illustrates a case in which two vessels 100 are connected to each other in series. For example, in a case in which the length of one element 101 is set to 1 m, when eight elements constitute one vessel, the total flow channel length (the total length in the flow direction of the supplied liquid) reaches a length of 8×2=16 m.

Each of the elements 101 in the container main body 102 has a structure in which, for example, a sac-like reverse osmosis membrane 12 including a flow channel material 112 is wound around the periphery of a collecting pipe 111 as illustrated in FIG. 7 in a spiral shape using a flow channel material (for example, a mesh spacer) 114 and a brine seal 115 is provided in one end. In addition, each of the elements 101 sequentially guides the water to be treated (raw water) 11 having a predetermined pressure, which is supplied from the front brine seal 115 side between the sac-like reverse osmosis membranes 12 using the flow channel material (for example, a mesh spacer) 114 and ejects the permeated water 13 which has permeated the reverse osmosis membrane 12 due to the reverse osmosis action through the collecting pipe 111. In addition, the non-permeated water 15 is also ejected from a rear seal 118 side. Meanwhile, the membrane length in the movement direction of the water to be treated 11 is L. Here, the constitution of the element 101 illustrated in FIG. 7 is also identical even in the constitution of the spiral first deposit detecting unit 24A illustrated in FIG. 4.

A collection of a plurality (for example, 50 to 100) of the pressure-resistant containers is used as one unit, the number of units is adjusted depending on the supply amount of the water to be treated 11 being treated, and the water to be treated is desalinated, thereby manufacturing product water.

In the related art, at least part of the non-permeated water from the basic design reverse osmosis membrane device 14 is permeated through a separation membrane for monitoring, and the precipitation of deposits included in the non-permeated water on the membrane surface of the separation membrane for monitoring is monitored using a pressure difference between pressure meters provided before and after the separation membrane for monitoring. However, there is a problem in that, in a case in which the pressure difference is confirmed, it is not possible to determine the precipitation of deposits until a large amount of the deposits are precipitated and thus flow channels are clogged with the deposits and the pressure difference changes.

In addition, there is another problem in that, in a case in which the pressure difference is measured, as the length of the separation membrane for monitoring increases, it becomes more difficult to accurately detect the precipitation.

Generally, in the operation of the reverse osmosis membrane device 14, it is assumed that there are dissolved components containing predetermined ions or organic substances in the water to be treated 11 and conditions under which deposits attributed to the dissolved components or the like containing ions are not deposited in the reverse osmosis membrane is designed as the operation condition. However, there are cases in which, due to the water quality variation or the like of the water to be treated 11 being supplied, the concentration of the dissolved components containing ions or organic substances becomes higher than the designed conditions, and a status in which deposits are easily deposited in the reverse osmosis membrane is formed. In this case, the permeated water flow rate of the permeated water 13 from the reverse osmosis membrane device 14 is confirmed using a flow instrument, and the reverse osmosis membrane is washed when the flow rate of the permeated water 13 decreases to a predetermined percentage, which is considered as a threshold value; however, at this time, deposits have already been deposited in a wide range of the reverse osmosis membrane, and it becomes difficult to wash the reverse osmosis membrane.

Therefore, in the present example, a deposit monitoring device for a reverse osmosis membrane device being provided with a non-permeated water line $L_{11}$ for discharging the non-permeated water 15 in which dissolved components containing ions or organic substances are concentrated from the reverse osmosis membrane device 14 in which the permeated water 13 has been filtrated from the water to be treated 11 by means of the reverse osmosis membrane, the first deposit detecting unit 24A provided in the non-permeated water branch line $L_{12}$ branched from the non-permeated water line $L_{11}$ and having the first reverse osmosis membrane for detection 21A in which the detection liquid 15a that has branched off is separated into the permeated water for detection 22 and the non-permeated water for detection 23, and the first flow rate measuring device for permeated water for detection 41A that measures the flow rate of the permeated water for detection 22 as illustrated in FIG. 1 is installed.

Figure 8:
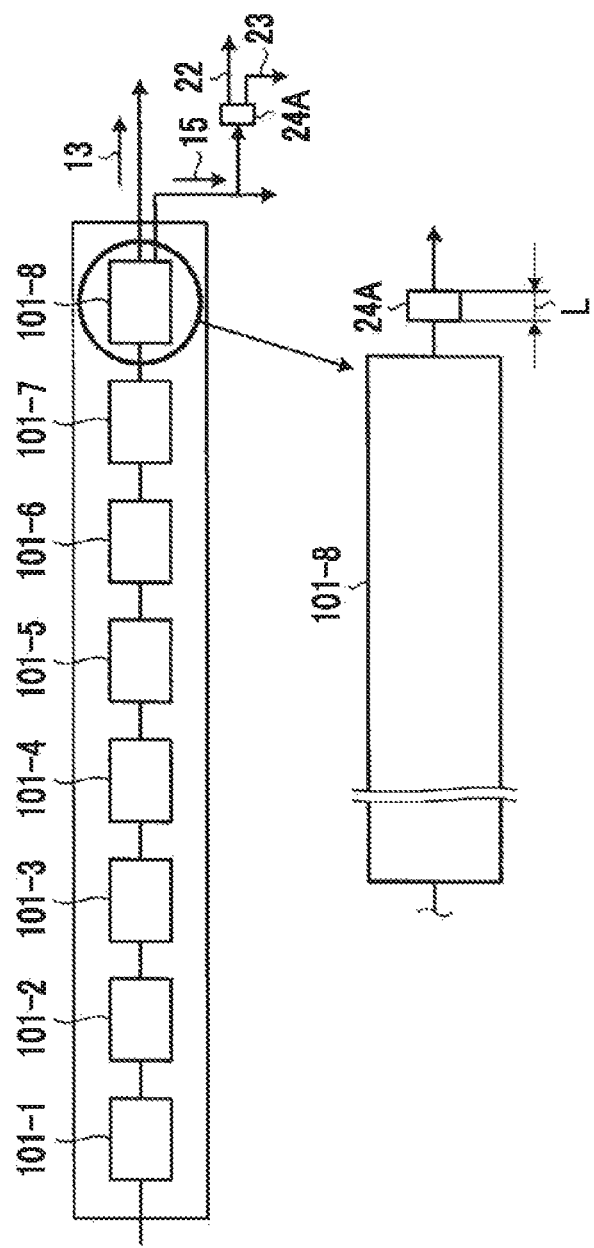
FIG. 8 is a schematic view illustrating that the first deposit detecting unit corresponds to a part of a basic design reverse osmosis membrane device.

FIG. 8 is a schematic view illustrating that the first deposit detecting unit corresponds to a part of a basic design reverse osmosis membrane device. As illustrated in FIG. 8, the detection of the deposit deposition state using the first reverse osmosis membrane for detection 21A in the first deposit detecting unit 24A is a simulation of a status of the deposition of deposit components (for example, gypsum) in the first reverse osmosis membrane for detection 21A in the final bristle (in a case in which eight elements 101 are coupled together in series, near the outlet terminal of the eighth element 101-8 of the elements 101-1 to 101-8) in the basic design reverse osmosis membrane device 14. In a case in which the membrane length L of the first reverse osmosis membrane for detection 21A in the first deposit detecting unit 24A is set to, for example, 16 mm, it becomes possible to simulate a state of the final tail portion being 16 mm.

That is, the first reverse osmosis membrane for detection 21A in the first deposit detecting unit 24A is in a state of being additionally provided in the basic design reverse osmosis membrane device 14. Therefore, in a case in which the length of the reverse osmosis membrane for detection 21A is set to, for example, 1,000 mm, the total length becomes the length of the reverse osmosis membrane in the basic design reverse osmosis membrane device 14 +1,000 mm.

Therefore, as the length L of the first reverse osmosis membrane for detection 21A decreases, simulation of an extremely short portion of the terminal portion of the basic design reverse osmosis membrane device 14 becomes possible.

From the test results described below, it is possible to simulate a portion near the outlet of the basic design reverse osmosis membrane device 14 since, in a case in which the first reverse osmosis membrane for detection 21A is 16 mm, the degree of supersaturation of gypsum in the detection liquid 15a of supplied water is 4.7, and the degree of supersaturation of gypsum in the non-permeated water 15 is also 4.7.

Here, the relationship among the elapse of operation, the permeated water flow rate, and the supply pressure in the first reverse osmosis membrane for detection 21A will be described using FIGS. 9 and 10.

Figure 9:
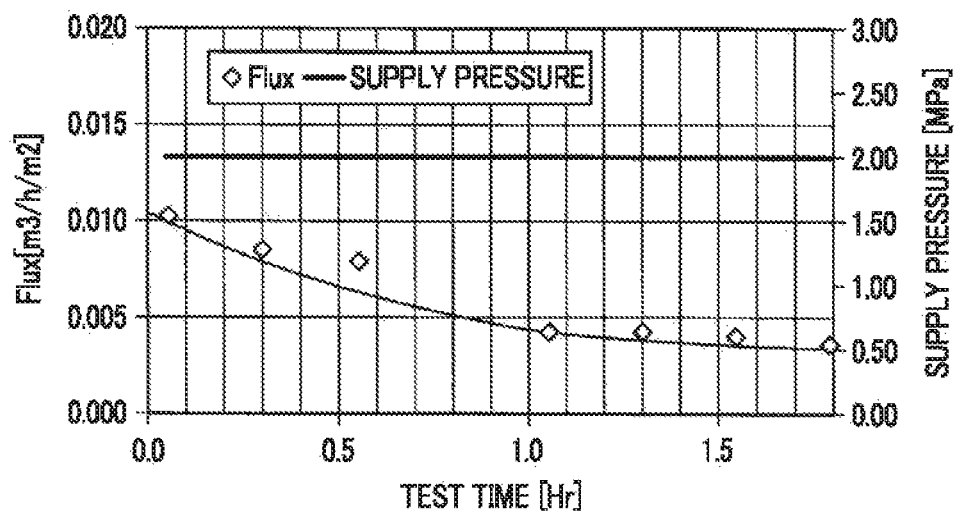
FIG. 9 is a view illustrating a flux ($m^3/h/m^2$) change in a case in which a length L of a reverse osmosis membrane for detection in the first deposit detecting unit is 16 mm.

FIG. 9 is a view illustrating a flux ($m^3/h/m^2$) change in a case in which the length L of the reverse osmosis membrane for detection in the first deposit detecting unit is 16 mm. FIG. 10 is a view illustrating a flux ($m^3/h/m^2$) change in a case in which the length L of the reverse osmosis membrane for detection in the first deposit detecting unit is 1,000 mm. FIGS. 9 and 10 are views illustrating the relationship among the elapsed time of operation, the permeated water flow rate, and the supply pressure in the first deposit detecting unit. In FIGS. 9 and 10, the left vertical axis indicates the flux ($m^3/h/m^2$), the right vertical axis indicates the supply pressure (MPa), and the horizontal axis indicates the operation time (hours). In the present test example, the detection liquid 15a adjusted so that gypsum is deposited as a deposit was used. Here, the flux refers to the permeated water flow rate per unit area.

Figure 10:
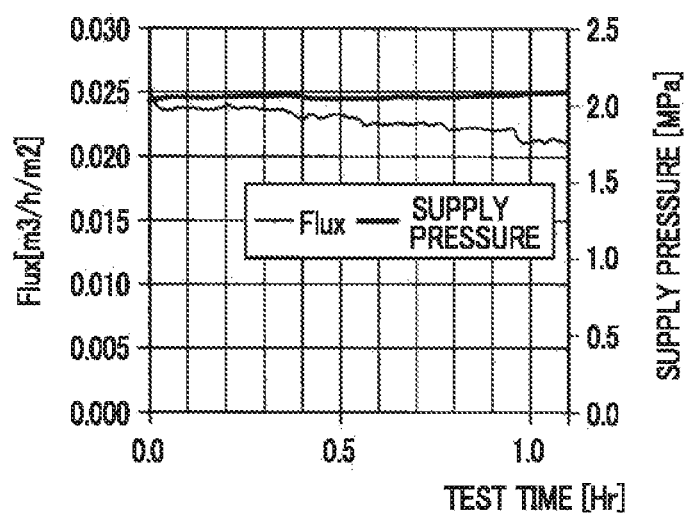
FIG. 10 is a view illustrating a flux ($m^3/h/m^2$) change in a case in which the length L of the reverse osmosis membrane for detection in the first deposit detecting unit is 1,000 mm.

In FIGS. 9 and 10, the result of the degree of a decrease in the permeated water flow rate due to the deposition of gypsum deposits in the first reverse osmosis membrane for detection 21A as the operation time elapses is confirmed under conditions in which the supply pressure of the detection liquid 15a to the first deposit detecting unit 24A is set to, for example, 2.0 MPa and the degree of supersaturation of gypsum in the detection liquid 15a being supplied to the first reverse osmosis membrane for detection 21A is set to 4.7.

In FIG. 9, it is confirmed that, in a case in which the length L of the reverse osmosis membrane for detection in the first deposit detecting unit 24A is 16 mm, and the supply pressure is set to, for example, 2.0 MPa, the behavior of the flux of the permeated water for detection 22 decreases by 50% or less in approximately one hour. In addition, at this time, the degree of supersaturation of gypsum in the non-permeated water for detection 23 is 4.7.

In FIG. 10, it is confirmed that, in a case in which the length L of the reverse osmosis membrane for detection in the first deposit detecting unit 24A is 1,000 mm, and the supply pressure is set to be, for example, as constant as 2.0 MPa, the behavior of the flux of the permeated water for detection 22 decreases by 10% or less in approximately one hour.

As a result, it is confirmed that, in the first deposit detecting unit 24A, a 10% decrease of the permeated water flow rate in the first reverse osmosis membrane for detection 21A can be detected in an extremely short time (approximately ten minutes or shorter in a case in which the length L of the reverse osmosis membrane is, for example, 16 mm).

Therefore, when the first deposit detecting unit 24A according to the present example is used, it is possible to rapidly detect a decrease of the permeated water flow rate by approximately 10% in one hour or shorter, preferably, 10 minutes or shorter.

Here, the degree of supersaturation refers to the ratio of the concentration of gypsum in a case in which, for example, when gypsum is used as an example, a state in which gypsum is saturated and dissolved under a certain condition (the degree of supersaturation of gypsum) is set to "1", and, for example, the degree of supersaturation of "5" indicates a concentration being five times higher than the degree of supersaturation of gypsum.

Next, a test for confirming whether or not the permeated water flow rate could be restored by washing the first reverse osmosis membrane for detection 21A was carried out.

Specifically, gypsum was forcibly precipitated in the first reverse osmosis membrane for detection 21A, the membrane was washed, and then whether or not the permeated water flow rate before the precipitation of gypsum could be restored was confirmed.

As the condition for the precipitation of gypsum which was a deposit, a condition in which the permeated water flow rate was decreased by 10% using the first flow rate measuring device for permeated water for detection 41A was set.

The operation conditions are shown in Table 1. Meanwhile, a NaCl evaluation liquid (NaCl: 2,000 mg/L) was used as the supply liquid.

TABLE 1

| Operation | Desalination (1) | Scale forcibly precipitated | Washing | Desalination (2) |
|---|---|---|---|---|
| Pressure condition | 1.18 MPa | 2.0 MPa | | 1.18 MPa |
| Amount of permeated water (ml/h) | 24 | Decreased | | 24 |
| Supply liquid | NaCl evaluation liquid | Gypsum supersaturated liquid | Ion-exchange water | NaCl evaluation liquid |
| Deposit | Absent | Present | | Absent |

The operation was handled as described below.

1) First, the amount of the permeated water in a case in which the pressure condition was set to 1.18 MPa and a NaCl evaluation liquid was used as the supply liquid was 24 ml/h.

2) After that, the supply pressure condition was increased to 2.0 MPa, the supply liquid was changed from the NaCl evaluation liquid to a gypsum-supersaturated liquid, scale was forcibly precipitated in the membrane, and a decrease of the permeated water flow rate by 10% was confirmed for ten minutes.

3) After that, the supplied water was changed from the gypsum-supersaturated liquid to ion-exchange water, and washing was carried out.

4) After the washing, the supply liquid was changed from the ion-exchange water to the NaCl evaluation liquid, operation was carried out under the operation condition of 1) (the pressure condition was 1.18 MPa), and the amount of the permeated water was found to be 24 ml/h.

As a result, it was confirmed that, in the initial stage of the precipitation of gypsum in the first reverse osmosis membrane for detection 21A, gypsum deposits could be washed by means of water washing, and the permeated water flow rate was restored to that before the precipitation of the deposits by carrying out washing.

It was confirmed that, in a case in which gypsum was washed, gypsum could be washed using pure water. Therefore, in the washing of the basic design reverse osmosis membrane device 14 as well, washing using the permeated water 13 becomes possible. Therefore, it becomes possible to reduce costs and reduce the damage of membranes in washing steps.

Figure 11:
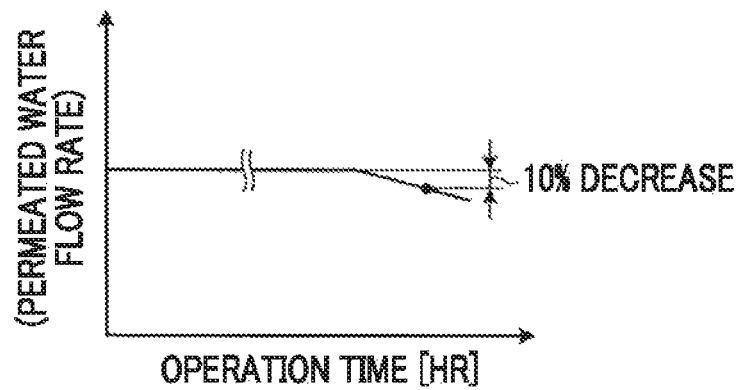
FIG. 11 is a view illustrating an example of a flow rate changing as an operation time elapses in Example 1.

Next, an example of a decrease in the permeated water flow rate due to the elapse of the operation time of the desalination treatment device will be described. FIG. 11 is a view illustrating an example of the permeated water flow rate changing as the operation time elapses in the present example. As illustrated in FIG. 11, in a case in which there are no changes in the concentration of the scale component in the water to be treated 11, the flow rate in the first deposit detecting unit 24A does not decrease. In addition, in a case in which the concentration of the scale component changes due to the water quality variation or the like of the water to be treated 11, the deposition of deposits in the first reverse osmosis membrane for detection 21A in the first deposit detecting unit 24A is initiated. It is possible to confirm a decrease in the flow rate in the first flow rate measuring device for permeated water for detection 41A in accordance with this deposition of deposits.

In addition, as illustrated in FIG. 11, when it is confirmed that a predetermined threshold value (for example, a case in which the flow rate of the detection liquid permeated water decreases by 10% is set as the threshold value), the deposition of deposits in the reverse osmosis membrane in the basic design reverse osmosis membrane device 14 is determined as the deposition initial state by the determination device 40. Meanwhile, the determination device 40 may be installed as necessary.

Here, the threshold value in the present invention refers to a change percentage of the flow rate of the permeated water for detection, and, in the example of FIG. 11, the predetermined threshold value indicates that a decrease percentage of the flow rate of the permeated water for detection is 10%.

In addition, as illustrated in FIG. 1, in the case of operating the desalination treatment device 10A, a decrease in the flow rate of the permeated water for detection 22 which is a separated water is measured with the first flow rate measuring device for permeated water for detection 41A using the first deposit detecting unit 24A, and, as a result of this measurement, whether or not the measured flow rate changes more than the predetermined threshold value is determined using the determination device 40. As a result of this determination, in a case in which the flow rate changes more than the predetermined threshold value, the deposition of deposits in the reverse osmosis membrane in the basic design reverse osmosis membrane device 14 is determined as the deposition initial state. As a result of this determination, the control device 45 sends a command for supplying the washing liquid 51 to the washing liquid supplying unit 52. This command stops the operation of the basic design reverse osmosis membrane device 14, then, the washing liquid 51 is supplied to the water to be treated supply line $L_1$, and washing is carried out. As the washing, it is possible to use, for example, flushing washing, sac bag washing, or the like. Meanwhile, in this washing as well, it is possible to use part of the permeated water 13.

At this time, as the washing liquid 51, part 13a of the produced permeated water 13 is sent to the washing liquid supplying unit 52 through a permeated water supply line $L_3$ and a washing treatment is carried out. Therefore, it is possible to avoid washing using chemicals.

In the above description, a determination is made by detecting the permeated water flow rate of the permeated water for detection 22 from the first deposit detecting unit 24A using the first flow rate measuring device for permeated water for detection 41A; however, in a case in which the non-permeated water for detection 23 is used, a determination is made in the following manner.

The non-permeated water flow rate of the non-permeated water for detection 23 from the first deposit detecting unit 24A is detected using the first flow rate measuring device for non-permeated water for detection 41B, and, when an increase in the non-permeated water flow rate is detected, the determination device 40 determines that deposits are deposited in the reverse osmosis membrane in the basic design reverse osmosis membrane device 14. As a result of this determination, the control device 45 carries out washing of the reverse osmosis membrane in the basic design reverse osmosis membrane device 14 using the washing liquid 51, whereby it is possible to prevent the performance degradation due to the deposition of deposits in the basic design reverse osmosis membrane device 14.

Therefore, according to the present example, it becomes possible to detect the deposition initial stage of deposits in the reverse osmosis membrane in the reverse osmosis membrane device 14 that treats the water to be treated 11.

As described above, in a case in which the flow rate of the permeated water for detection 22 becomes equal to or less than the predetermined threshold value that has been set in advance, it is possible to determine the deposition of deposits in the reverse osmosis membrane in the basic design reverse osmosis membrane device 14 as the deposition initial stage using the first deposit detecting unit 24A, and, as a result of this determination, washing is carried out by supplying the washing liquid, whereby it is possible to prevent the deposit deposition in the reverse osmosis membrane in the basic design reverse osmosis membrane device 14.

Generally, in a case in which poorly-soluble substances such as gypsum are deposited in the reverse osmosis membrane, it is not possible to remove the deposits by a washing treatment; however, when the first deposit detecting unit 24A of the present example is used, it is possible to learn the extremely initial deposition state of gypsum, and thus it becomes possible to remove deposits by washing in a state in which gypsum crystals are in a fine state in which the gypsum crystals can be easily dissolved.

As a result, since countermeasures in the initial stage of the deposit deposition in the reverse osmosis membrane in the basic design reverse osmosis membrane device 14, unlike in the related art, rapid countermeasures can be taken, it is not necessary to use acidic or alkaline washing liquids, and contributions can be made to improving the service lives of reverse osmosis membranes.

In the above-described example, in a case in which the supply pressure of the supply liquid and the supply liquid flow rate of the supply liquid are set to be constant, when deposits are deposited in the reverse osmosis membrane, since the permeated water flow rate (or flux) decreases, the supply pressure and the supply flow rate of the detection liquid are set to the predetermined values, and, in a case in which the permeated water for detection flow rate (or flux) becomes equal to or less than the threshold value, it is determined that deposits are deposited in the reverse osmosis membrane for detection.

In contrast, in a case in which the permeated water flow rate (or flux) is set to be constant, when deposits are deposited in the reverse osmosis membrane, it is necessary to increase the supply pressure of the supply liquid (increase the flux).

Therefore, in a case in which the supply pressure of the supply liquid is controlled so that the flow rate of the separated liquid for detection (permeated water for detection or non-permeated water for detection) becomes constant and the supply pressure becomes equal to or higher than the threshold value, it is also possible to determined that deposits are deposited in the reverse osmosis membrane for detection.

Example 2

Figure 12:
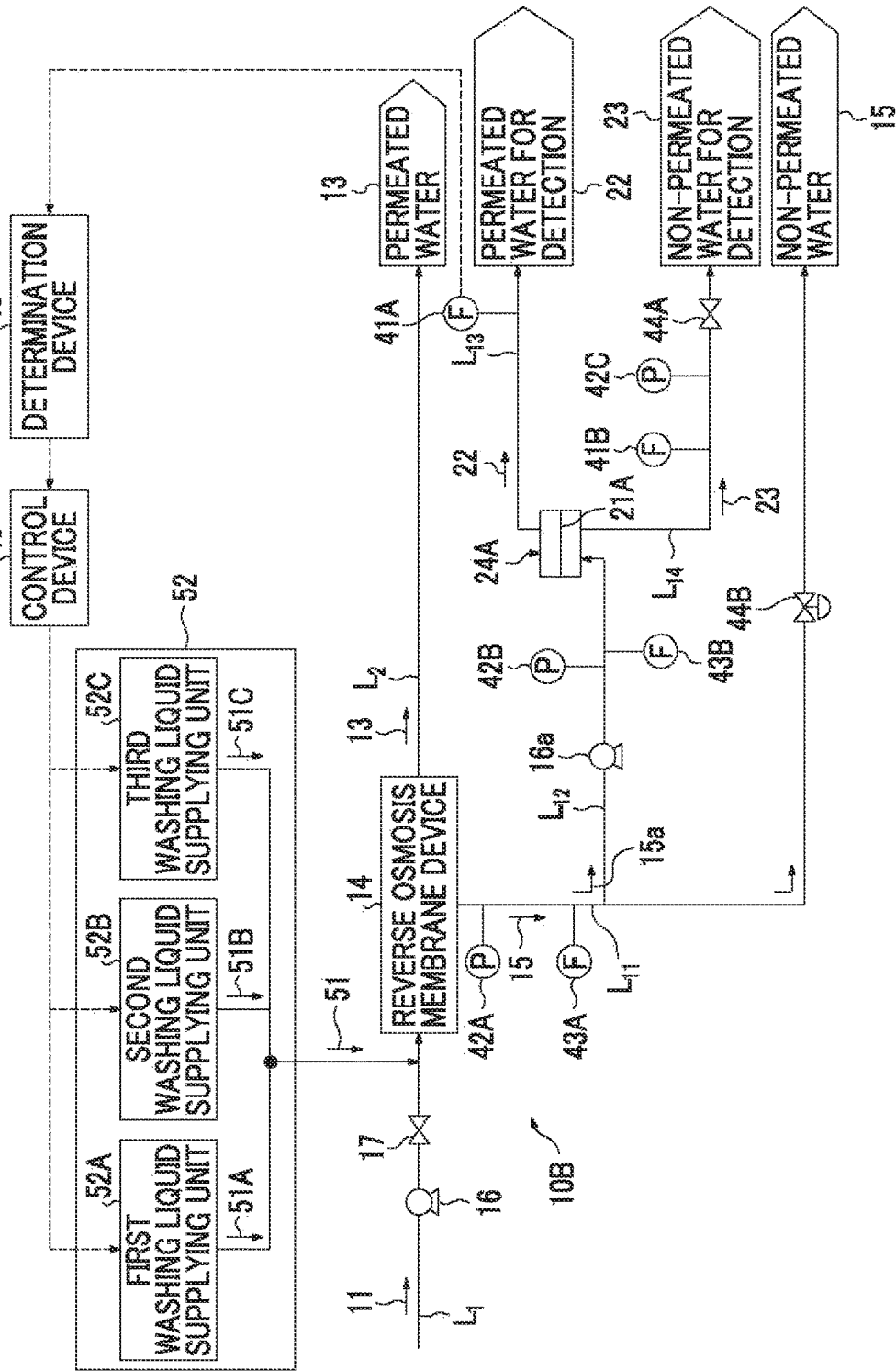
FIG. 12 is a schematic view of a desalination treatment device according to Example 2.

FIG. 12 is a schematic view of a desalination treatment device according to Example 2. Meanwhile, the same members as those in Example 1 will be given the same reference sign and will not be described. As illustrated in FIG. 12, a desalination treatment device 10B according to the present example is a device in which deposit components deposited in the first reverse osmosis membrane for detection 21A in the first deposit detecting unit 24A are analyzed and washing is carried out on the deposits.

That is, in the present example, when deposits are deposited in the first reverse osmosis membrane for detection 21A in the first deposit detecting unit 24A, the deposition of these deposits is separately analyzed.

In addition, as a result of the analysis, out of previously-selected, for example, three types of washing liquid 51 (the first to third washing liquid 51A to 51C), the optimal washing liquid is selected, and washing is carried out using the optical washing liquid from the first to third washing liquid supplying units 52 (52A to 52C) as the washing liquid in the basic design reverse osmosis membrane device 14.

A variety of the washing liquids 51 are respectively supplied to the first reverse osmosis membrane for detection 21A in which the deposits have been deposited, and the permeated water for detection flow rate in the first reverse osmosis membrane for detection 21A is measured using the first flow rate measuring device for permeated water for detection 41A, thereby confirming the washing effect on the deposits in the first reverse osmosis membrane for detection 21A.

When the permeated water for detection flow rate is measured, it is possible to select the most effective washing conditions (washing liquid, temperature, and the like) for the deposits in the first reverse osmosis membrane for detection 21A. This selection result can be set as the washing condition for the reverse osmosis membrane in the basic design reverse osmosis membrane device 14.

In the related art, even when washing conditions (washing liquid and washing order) recommended for deposits have been specified, it is difficult to specify deposits in actual reverse osmosis membranes, deposits are assumed on the basis of prediction from the water quality of the water to be treated 11, and a washing liquid is selected, and thus there are cases in which appropriate washing is not possible.

In contrast, it becomes possible to evaluate the washing performances of a variety of washing liquids on actual deposits. When these evaluation results are reflected for the reverse osmosis membrane in the basic design reverse osmosis membrane device 14, it becomes possible to carry out appropriate washing.

As a result, it becomes possible to easily select the most effective washing liquid with respect to deposits that are deposited in the reverse osmosis membrane in the basic design reverse osmosis membrane device 14.

In addition, the effective washing of the reverse osmosis membrane in the basic design reverse osmosis membrane device 14 becomes possible, and it is possible to shorten the washing time and reduce the amount of the washing liquid used.

Here, deposits, for example, calcium carbonate, magnesium hydroxide, iron hydroxide, and the like can be washed using an acidic aqueous solution in which hydrochloric acid or the like is used. In addition, silica, organic substances, and the like can be washed using an alkaline aqueous solution in which sodium hydroxide or the like is used.

Together with this washing work, furthermore, the operation condition may be changed to an operation condition under which deposits are not deposited in the reverse osmosis membrane in the basic design reverse osmosis membrane device 14. Meanwhile, this work and washing may be carried out at the same time or may be sequentially carried out.

The change content of the operation condition can be exemplified as follows:

1) An operation for increasing the addition concentration of a deposit retarder being supplied to the water to be treated 11 before the introduction of the water to be treated into the basic design reverse osmosis membrane device 14 is carried out.

2) An operation for decreasing the supplied liquid flow rate of the water to be treated 11 to the basic design reverse osmosis membrane device 14 is carried out.

3) An operation for decreasing the supplied liquid pressure of the water to be treated 11 to the basic design reverse osmosis membrane device 14 is carried out.

When the operation condition is changed to the above-described operation condition under which deposits are not deposited, the desalination treatment device is stabilized, and it is possible to carry out a desalination treatment.

In addition, it is also possible to select a deposit retarder in the same manner as in the selection of the washing liquid and supply an appropriate deposit retarder.

Example 3

Figure 13:
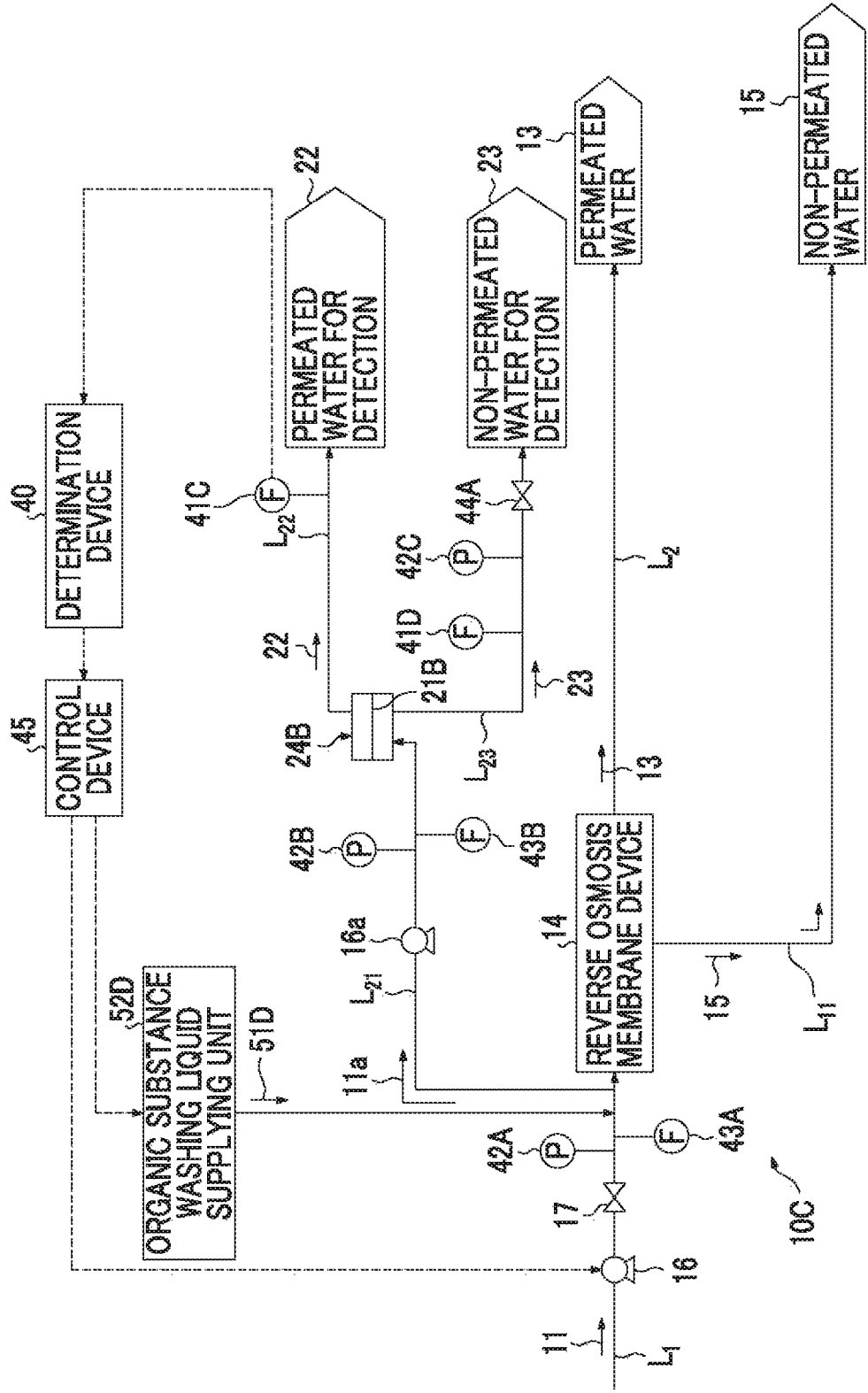
FIG. 13 is a schematic view of a desalination treatment device according to Example 3.

FIG. 13 is a schematic view of a desalination treatment device according to Example 3. Meanwhile, the same members as those in Example 1 will be given the same reference signs and will not be described again.

In the case of the desalination treatment device 10A of Example 1, the timing at which the deposition of deposits attributed to the scale components in the non-permeated water 15 initiates is detected using the non-permeated water 15 from the reverse osmosis membrane device 14; however, in the desalination treatment device 10C of the present example, as illustrated in FIG. 13, the timing at which biofouling caused by deposits attributed to organic components or microbes in the water to be treated 11 initiates is detected on the front (supply) side of the reverse osmosis membrane device 14. Meanwhile, the constitution of a second deposit detecting unit 24B in the present example is identical to the constitution of the first deposit detecting unit 24A in Example 1 and thus will not be described again.

As illustrated in FIG. 13, a desalination treatment device 10C according to the present example is provided with the reverse osmosis membrane device 14 which has a reverse osmosis membrane for concentrating dissolved components containing ions or organic substances from the water to be treated 11 and obtaining the permeated water, a second deposit detecting unit 24B provided in a water to be treated branch line $L_{21}$ branched from a water to be treated supply line $L_1$ for supplying the water to be treated 11, using part of the water to be treated 11 that has branched off as the detection liquid 11a, and having a second reverse osmosis membrane for detection 21B in which the detection liquid 11a is separated into the permeated water for detection 22 and the non-permeated water for detection 23, second flow rate measuring devices for separated liquid for detection (a second flow rate measuring device for permeated water for detection 41C and a second flow rate measuring device for non-permeated water for detection 41D) that measure the flow rates of the separated liquid (the permeated water for detection 22 and the non-permeated water for detection 23) separated by the second reverse osmosis membrane for detection 21B, and the determination device 40 for determining a deposition initial stage of deposits in the reverse osmosis membrane in the reverse osmosis membrane device 14 in a case in which the measured flow rate changes from the predetermined threshold value as a result of measurement of the second flow rate measuring devices for separated liquid for detection (the second flow rate measuring device for permeated water for detection 41C and the second flow rate measuring device for non-permeated water for detection 41D).

In the present example, the second flow rate measuring device for permeated water for detection 41C that measures the flow rate of the permeated water for detection 22 is provided in the permeated water for detection discharge line $L_{22}$, and the second flow rate measuring device for non-permeated water for detection 41D that measures the flow rate of the non-permeated water for detection 23 is provided in the non-permeated water for detection discharge line $L_{23}$. In addition, similar to Example 1, the determination device 40 may be installed as necessary.

Meanwhile, the second reverse osmosis membrane for detection 21B may be a membrane of a material which is identical to or different from that of the first reverse osmosis membrane for detection 21A in Example 1.

Biofouling caused by the deposition of organic components or microbes occurs on the supply side of the water to be treated 11 of the reverse osmosis membrane in the reverse osmosis membrane device 14.

Therefore, the second deposit detecting unit 24B having the second reverse osmosis membrane for detection 21B is provided in the water to be treated branch line $L_{21}$ branched from the water to be treated supply line $L_1$, whereby it is possible to simulate the deposition state of deposits in the head portion of the membrane elements in the reverse osmosis membrane device 14.

The permeated water flow rate of the permeated water for detection 22 is measured using the second deposit detecting unit 24B in the present example, and a decrease in the permeated water flow rate is detected using the second flow rate measuring device for permeated water for detection 41C, whereby it is possible to detect the initiation initial stage of biofouling caused by the deposition of organic components or microbes in the reverse osmosis membrane in the basic design reverse osmosis membrane device 14.

In addition, the permeated water flow rate of the permeated water for detection 22 from the second deposit detecting unit 24B is detected using the second flow rate measuring device for permeated water for detection 41C, and, when a decrease in the permeated water flow rate is detected, the determination device 40 determines that deposition occurs in the reverse osmosis membrane in the basic design reverse osmosis membrane device 14. As a result of this determination, the control device 45 carries out washing of the reverse osmosis membrane in the basic design reverse osmosis membrane device 14 using the washing liquid 51, whereby it is possible to prevent the performance degradation due to biofouling caused by the deposition of organic components or microbes in the basic design reverse osmosis membrane device 14.

That is, as illustrated in FIG. 13, in the case of operating the desalination treatment device 10B, a decrease in the flow rate of the permeated water for detection 22 which is a separated water is measured using the second deposit detecting unit 24B at a second flow rate measuring device for permeated water for detection 41C, and, as a result of this measurement, whether or not the measured flow rate changes more than the predetermined threshold value is determined using the determination device 40. As a result of this determination, the deposition of deposits in the reverse osmosis membrane in the basic design reverse osmosis membrane device 14 is determined as the deposition initial state.

As a result of this determination, the control device 45 sends a command for supplying the washing liquid for organic substances 51D from the washing liquid supplying unit for organic substances 52D. This command stops the operation of the basic design reverse osmosis membrane device 14, then, the washing liquid for organic substances 51D is supplied to the water to be treated supply line $L_1$, and washing is carried out.

In addition, when the non-permeated water flow rate of the non-permeated water for detection 23 from the second deposit detecting unit 24B is detected using the second flow rate measuring device for non-permeated water for detection 41D and an increase in the non-permeated water flow rate is detected, it is also possible to determine using the determination device 40 that deposition occurs in the reverse osmosis membrane in the basic design reverse osmosis membrane device 14. As a result of this determination, the control device 45 carries out the washing of the reverse osmosis membrane in the basic design reverse osmosis membrane device 14 using the washing liquid for organic substances 51D, whereby it is possible to prevent performance degradation due to the biofouling caused by deposition of organic components or microbes in the basic design reverse osmosis membrane device 14.

With respect to biofouling caused by deposits attributed to organic components or microbes, washing becomes possible when, for example, the washing liquid for organic substances 51D obtained by adding a surfactant to an aqueous solution of sodium hydroxide is used.

Together with this washing work, furthermore, the operation condition may be changed to the operation not allowing deposits to be deposited in the reverse osmosis membrane in the basic design reverse osmosis membrane device 14. Meanwhile, this work and washing may be carried out at the same time or may be sequentially carried out.

1) An operation for decreasing the amount of a bactericidal agent (a chlorine-based bactericidal agent (for example, chloramine) or a medicine having an oxidation performance such as hydrogen peroxide) added is carried out.

2) An operation for increasing the amount of an agglomerating agent for organic substances added is carried out.

3) A flow channel is changed so as to run through to an organic adsorption tower (sand filtration, an activated coal adsorption tower, dissolved air flotation (DAF), a sterilization filter, or the like).

4) An operation for increasing the pH of the water to be treated 11 being supplied to the reverse osmosis membrane device 14 is carried out.

5) An operation for adding a washing liquid for organic substances is carried out.

When the operation condition is changed to the above-described operation condition under which deposits are not deposited, the desalination treatment device is stabilized, and it is possible to carry out a desalination treatment.

Figure 14:
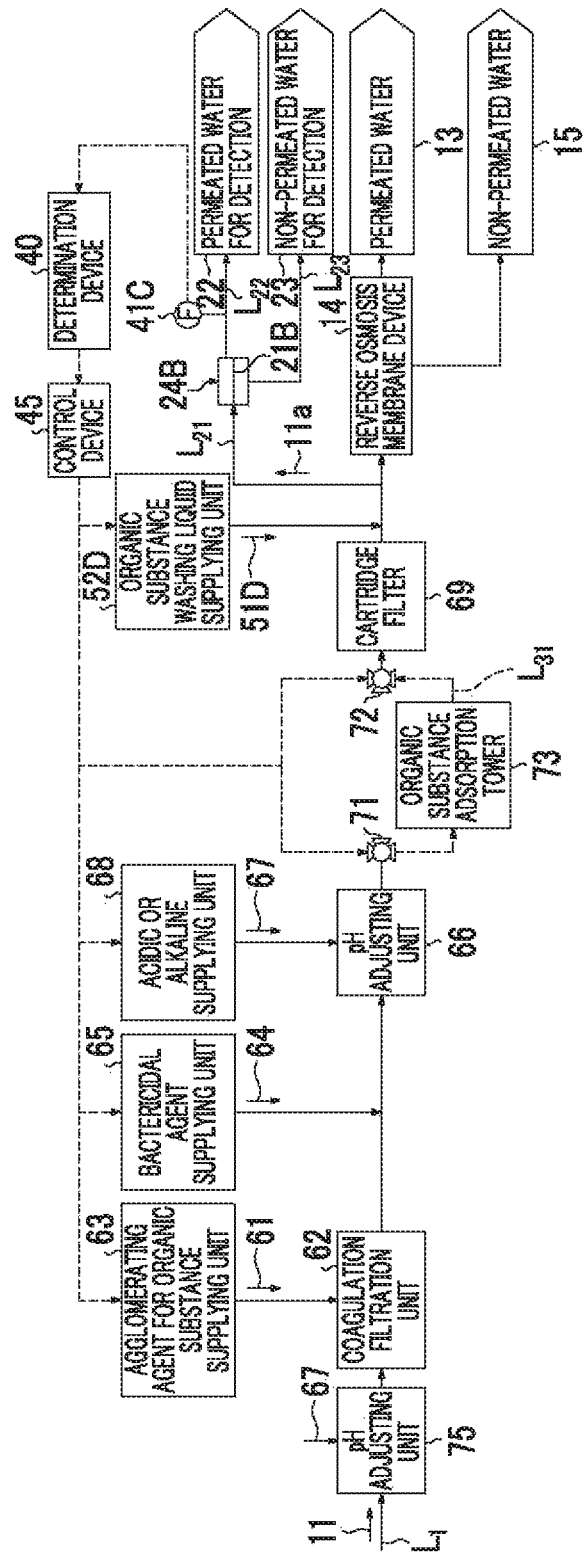
FIG. 14 is a schematic view illustrating an example of an operation condition change in the desalination treatment device according to Example 3.

FIG. 14 is a schematic view illustrating an example of changing the operation conditions of the desalination treatment device according to Example 3.

In FIG. 14, when the permeated water flow rate of the permeated water for detection 22 from the second deposit detecting unit 24B is detected using the second flow rate measuring device for permeated water for detection 41C and a decrease of the permeated water flow rate is detected, it is determined by the determination device 40 that deposition occurs in the membrane. As a result of this determination, in a case in which washing is carried out, washing is carried out by supplying a washing liquid for organic substances 51D from a washing liquid supplying unit for organic substances 52D.

In addition, in the present example, as illustrated in FIG. 14, in a case in which the amount of an agglomerating agent for organic substances 61 added to the water to be treated 11 is adjusted, the agglomerating agent for organic substances 61 is supplied from the agglomerating agent for organic substances supplying unit 63 to the coagulation filtration unit 62, and organic substances are removed by the supply of the agglomerating agent for organic substances 61.

In addition, in a case in which the amount of a bactericidal agent 64 added to the water to be treated 11 is adjusted, the bactericidal agent 64 is supplied from a bactericidal agent supplying unit 65 on the lower stream side of the coagulation filtration unit 62. The amount of the bactericidal agent 64 added is decreased, thereby decreasing organic substances derived from microbes.

In addition, in a case in which the pH of the water to be treated 11 being introduced into the reverse osmosis membrane device 14 is adjusted, the acidic or alkaline pH adjuster 67 being supplied to the pH adjusting unit 66 on the lower stream side of the coagulation filtration unit 62 is supplied from the acidic or alkaline supplying unit 68, and the pH is adjusted, thereby annihilating microbes. In addition, when the pH is increased, the dissolution and deposition of organic substances is prevented.

In addition, in a case in which organic substances in the water to be treated 11 is further removed, switching units 71 and 72 for branching the flow channel from the water to be treated introduction line $L_1$ are handled on the lower stream side of the pH adjusting unit 66, the water to be treated 11 is passed through to an organic substance adsorption tower 73 interposed in a bypass channel $L_{31}$, and organic substances in the water to be treated 11 is adsorbed and removed.

In addition, a cartridge filter 69 is installed on the upper stream side of the reverse osmosis membrane device 14, and impurities in the water to be treated 11 are further filtered.

In FIG. 14, the reference sign 75 indicates the pH adjusting unit and adjusts the pH of the water to be treated 11 which is raw water using the (acidic or alkaline) pH adjuster 67.

Example 4

Figure 15:
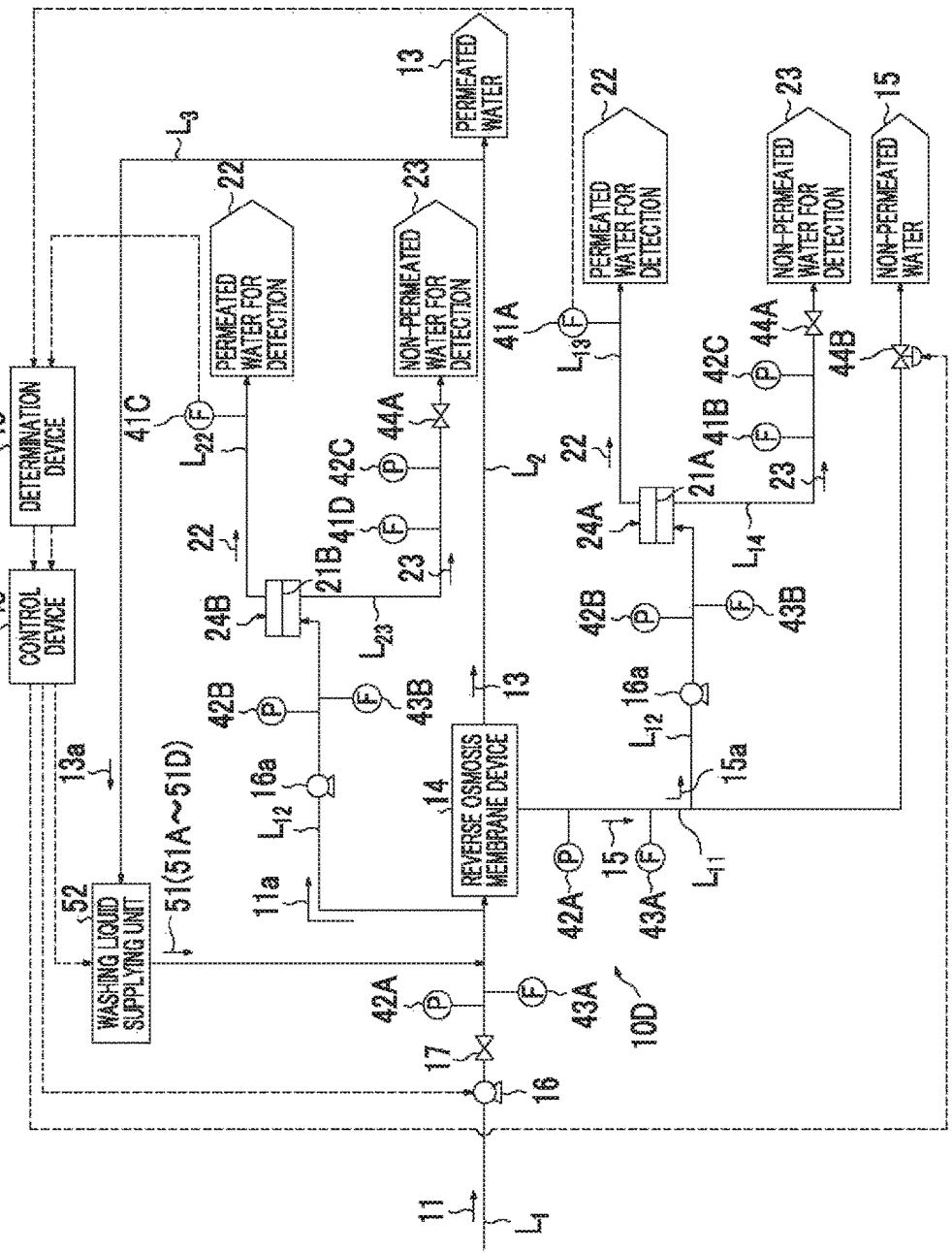
FIG. 15 is a schematic view of a desalination treatment device according to Example 4.

FIG. 15 is a schematic view of a desalination treatment device according to Example 4. Meanwhile, the same members as those in Examples 1 to 3 will be given the same reference signs and will not be described again.

In the present example, as illustrated in FIG. 15, a desalination treatment device 10D of the present example is a device that detects the timing at which the deposition of deposits attributed to the scale components in the non-permeated water 15 initiates using the non-permeated water 15 from the reverse osmosis membrane device 14 in the desalination treatment device 10A in Example 1 and detects the timing at which biofouling caused by deposits attributed from organic substances in the water to be treated 11 initiates using the water to be treated 11 before being supplied to the reverse osmosis membrane device 14 in the desalination treatment device 10C of Example 3.

In the present example, the initial stage of the deposition initiation of deposits in the reverse osmosis membrane in the basic design reverse osmosis membrane device 14 is determined by measuring the permeated water flow rate of the permeated water for detection 22 using the first deposit detecting unit 24A of the present example and detecting a decrease in the permeated water flow rate using the first flow rate measuring device for permeated water for detection 41A, and the initiation initial stage of biofouling caused by deposits attributed to organic components or microbes in the reverse osmosis membrane in the basic design reverse osmosis membrane device 14 is determined by measuring the permeated water flow rate of the permeated water for detection 22 using the second deposit detecting unit 24B and detecting a decrease in the permeated water flow rate using the second flow rate measuring device for permeated water for detection 41C.

In addition, when the washing liquid 51 is supplied from the washing liquid supplying unit 52 using the control device 45 on the basis of the above-described determination, it is possible to prevent performance degradation due to the biofouling caused by deposits attributed to organic components or microbes in the basic design reverse osmosis membrane device 14. The washing liquid 51 in the present example may be selected in advance or, as in Example 2, may be selected each time deposits are analyzed.

Meanwhile, in FIG. 15, as the washing liquid 51, it becomes possible to supply, for example, any one of the first to third washing liquids 51A to 51C which corresponds to the scale component and the washing liquid for organic substances 51D for preventing performance degradation due to biofouling caused by the deposition of organic components or microbes. Furthermore, out of the operation conditions illustrated in FIG. 14, it is also possible to carry out other operation controls for adding, for example, an agglomerating agent for organic substances 61 in addition to washing using the washing liquid for organic substances 51D.

As a result, it becomes possible to easily select the most effective washing liquid 51 (any one of the first to third washing liquids 51A to 51C and the washing liquid for organic substances 51D) for deposits that are actually deposited in the basic design reverse osmosis membrane device 14 and carry out washing. Therefore, it becomes possible to shorten the washing time by means of the effective washing of the basic design reverse osmosis membrane device 14 and reduce the amount of the washing liquid used.

Furthermore, together with this washing work, it is also possible to change the operation condition to the above-described operation condition under which deposits are not deposited in the reverse osmosis membrane in the basic design reverse osmosis membrane device 14.

Example 5

Figure 16:
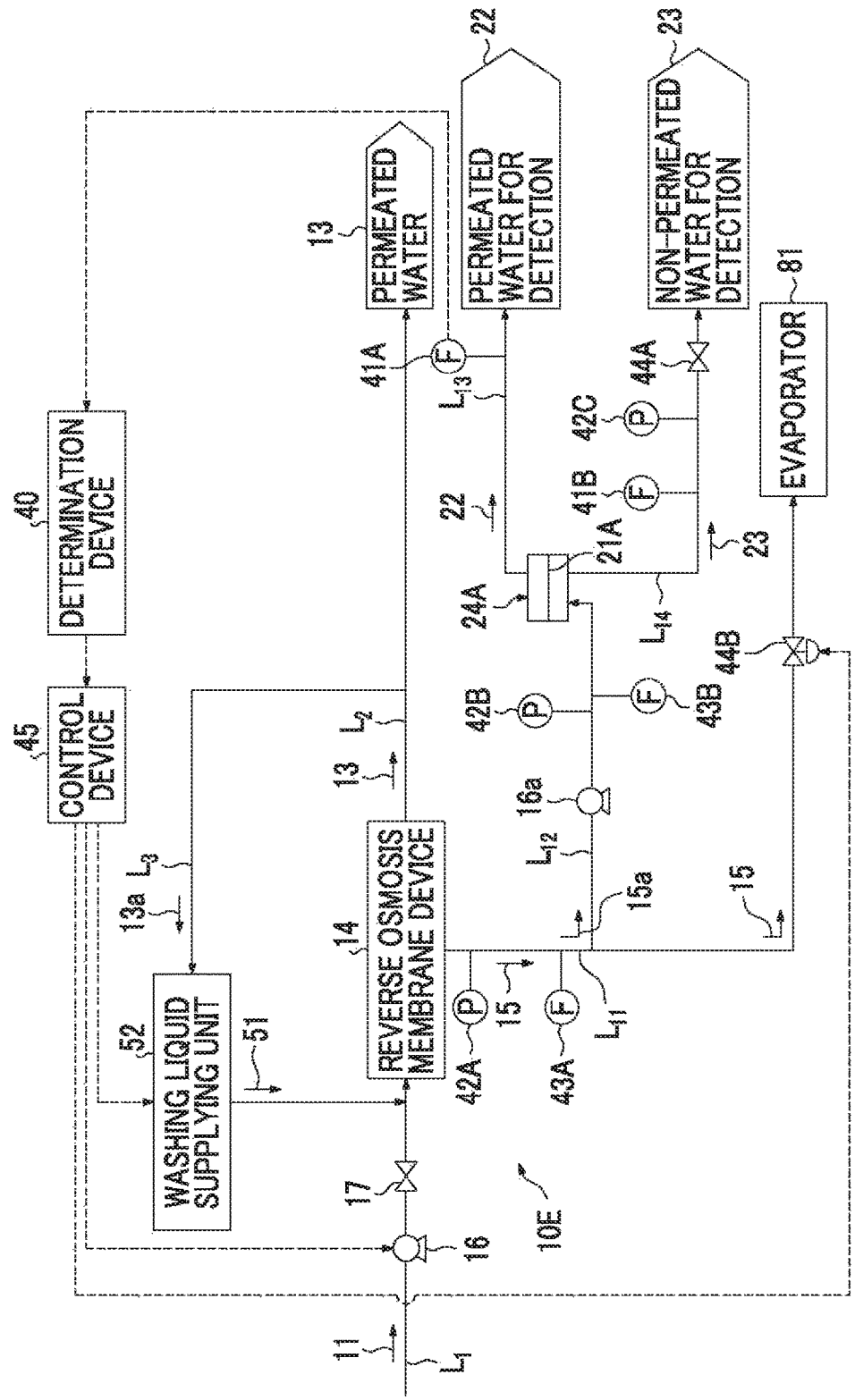
FIG. 16 is a schematic view of a desalination treatment device according to Example 5.

FIG. 16 is a schematic view of a desalination treatment device according to Example 5. Meanwhile, the same members as those in Example 1 will be given the same reference signs and will not be described again.

In the present example, as illustrated in FIG. 16, in a desalination treatment device 10E of the present example, an evaporator 81 for further concentrating the non-permeated water 15 from the reverse osmosis membrane device 14 in the desalination treatment device 10A of Example 1 is installed in the non-permeated water line $L_{11}$.

The evaporator 81 enables the removal of moisture from the non-permeated water 15 and, furthermore, also enables the collection of solid included in the non-treating water 15.

As described in Example 1, when the deposition initial stage of deposits in the reverse osmosis membrane in the basic design reverse osmosis membrane device 14 is detected, washing is carried out, and the operation condition is changed to an operation condition under which deposits are not deposited, the stable operation of the basic design reverse osmosis membrane device 14 becomes possible. Therefore, the stable operation of the evaporator 81 for further concentrating the non-permeated water 15, which is installed in the latter stream, becomes possible.

Here, examples of the evaporator 81 include evaporation devices that evaporate moisture, distillation devices, crystallization devices, zero water discharge devices, and the like.

REFERENCE SIGNS LIST

10A TO 10E DESALINATION TREATMENT DEVICE
11 WATER TO BE TREATED
11a DETECTION LIQUID
13 PERMEATED WATER
14 REVERSE OSMOSIS MEMBRANE DEVICE
15 NON-PERMEATED WATER
15a DETECTION LIQUID
$L_{11}$ NON-PERMEATED WATER LINE
$L_{12}$ NON-PERMEATED WATER BRANCH LINE
$L_{21}$ WATER TO BE TREATED BRANCH LINE
21A FIRST REVERSE OSMOSIS MEMBRANE FOR DETECTION
21B SECOND REVERSE OSMOSIS MEMBRANE FOR DETECTION
22 PERMEATED WATER FOR DETECTION
23 NON-PERMEATED WATER FOR DETECTION
24A FIRST DEPOSIT DETECTING UNIT
24B SECOND DEPOSIT DETECTING UNIT
40 DETERMINATION DEVICE
41A FIRST FLOW RATE MEASURING DEVICE FOR PERMEATED WATER FOR DETECTION
41B FIRST FLOW RATE MEASURING DEVICE FOR NON-PERMEATED WATER FOR DETECTION
41C SECOND FLOW RATE MEASURING DEVICE FOR PERMEATED WATER FOR DETECTION
41D SECOND FLOW RATE MEASURING DEVICE FOR NON-PERMEATED WATER FOR DETECTION
45 CONTROL DEVICE

The invention claimed is:

1. A water treatment device comprising:
a separation membrane device having a separation membrane for concentrating dissolved components and dispersed components from water to be treated and obtaining permeated water and non-permeated water;
a first deposit detecting unit provided in a non-permeated water branch line branched from a non-permeated water line for discharging non-permeated water in which dissolved components and dispersed components have been concentrated, using part of the non-permeated water that has branched off as a detection liquid, and having a first detector membrane in which the detection liquid is separated into permeated water for detection and non-permeated water for detection;
two first flow rate measuring devices that measure the flow rates of the permeated water for detection separated by the first detector membrane and the non-permeated water for detection separated by the first detector membrane;
a washing liquid supplying unit that supplies a washing liquid to the separation membrane device; and
a control device configured to determine whether at least one of results of measurement of the two first flow rate measuring devices changes more than a predetermined threshold value to thereby determine that deposition of deposits in the separation membrane in the separation membrane device is in a deposition initial state, and further configured to carry out washing on the separation membrane in the separation membrane device by supplying the washing liquid from the washing liquid supplying unit to the separation membrane device and carry out a control for changing an operation condition of changing addition concentration of a deposit retarder being supplied to the water to be treated before introduction of the water to be treated into the separation membrane device on the basis of the determination result for the deposition initial state.

2. The water treatment device according to claim 1, wherein,
when the flow rate of the permeated water for detection measured by the first flow rate measuring device reaches the predetermined threshold value or lower, the separation membrane in the separation membrane device is determined to be in an initial stage of deposit deposition.

3. The water treatment device according to claim 1, wherein,
when the flow rate of the non-permeated water for detection measured by the first flow rate measuring device reaches the predetermined threshold value or higher, the separation membrane in the separation membrane device is determined to be in an initial stage of deposit deposition.

4. The water treatment device according to claim 1, wherein a length of a flow channel in the first deposit detecting unit is $\frac{1}{10}$ or less of a total length in a supply liquid flow direction of the separation membrane being used in the separation membrane device.

5. The water treatment device according to claim 1, further comprising:
an evaporator that evaporates moisture of the non-permeated water from the separation membrane device.

6. An operating method for a water treatment device according to claim 1, comprising:
wherein the control device is further configured to select one or both of a deposit washing liquid for washing deposits deposited in the first detector membrane in the first deposit detecting unit and a deposit retarder for retarding deposition of deposits as the washing liquid; and supplying this selected deposit washing liquid or deposit retarder to the separation membrane device, when a flow rate of the separated liquid is changed from a predetermined threshold value using the first deposit detecting unit in the water treatment device.

7. The operating method for a water treatment device according to claim 6,
wherein moisture of the non-permeated water from the separation membrane device is evaporated.

8. A water treatment device comprising:
a separation membrane device having a separation membrane for concentrating dissolved components and dispersed components from water to be treated and obtaining permeated water and non-permeated water;
a deposit detecting unit provided in a water to be treated branch line branched from a water to be treated supply line for supplying the water to be treated, using part of the water to be treated that has branched off as a detection liquid, and having a detector membrane in which the detection liquid is separated into permeated water for detection and non-permeated water for detection;
two flow rate measuring devices that measure the flow rates of the permeated water for detection separated by the detector membrane and the non-permeated water for detection separated by the detector membrane;
a washing liquid supplying unit that supplies a washing liquid to the separation membrane device; and
a control device configured to determine whether at least one of results of measurement of the two flow rate measuring devices changes more than a predetermined threshold value to thereby determine that deposition of deposits in the separation membrane in the separation membrane device is in a deposition initial state, and further configured to carry out washing on the separation membrane in the separation membrane device by supplying the washing liquid from the washing liquid supplying unit to the separation membrane device and carry out a control for changing an operation condition of changing addition concentration of a deposit retarder being supplied to the water to be treated before introduction of the water to be treated into the separation membrane device on the basis of the determination result for the deposition initial state.

9. The water treatment device according to claim 8, wherein a length of a flow channel in the deposit detecting unit is 1/10 or less of a total length in a supply liquid flow direction of the separation membrane being used in the separation membrane device.

10. An operating method for a water treatment device according to claim 1, comprising:
wherein the control device is further configured to select one or both of a deposit washing liquid for washing deposits deposited in the detector membrane in the deposit detecting unit and a deposit retarder for retarding deposition of deposits as the washing liquid; and supplying this selected deposit washing liquid or deposit retarder to the separation membrane device, when a flow rate of the separated liquid is changed from a predetermined threshold value using the deposit detecting unit in the water treatment device.

11. The operating method for a water treatment device according to claim 10,
wherein moisture of the non-permeated water from the separation membrane device is evaporated.

12. A water treatment device comprising:
a separation membrane device having a separation membrane for concentrating dissolved components and dispersed components from water to be treated and obtaining permeated water and non-permeated water;
a first deposit detecting unit provided in a non-permeated water branch line branched from a non-permeated water line for discharging non-permeated water in which dissolved components and dispersed components have been concentrated, using part of the non-permeated water that has branched off as a detection liquid, and having a first detector membrane in which the detection liquid is separated into permeated water for detection and non-permeated water for detection;
two first flow rate measuring devices that measure the flow rates of the permeated water for detection separated by the first detector membrane and the non-permeated water for detection separated by the first detector membrane;
a second deposit detecting unit provided in a water to be treated branch line branched from a water to be treated supply line for supplying the water to be treated, using part of the water to be treated that has branched off as a detection liquid, and having a second detector membrane in which the detection liquid is separated into permeated water for detection and non-permeated water for detection;
two second flow rate measuring devices that measure the flow rates of the permeated water for detection separated by the second detector membrane and the non-permeated water for detection separated by the second detector membrane;
a washing liquid supplying unit that supplies a washing liquid to the separation membrane device; and a control device configured to determine whether at least one of results of measurement of the two first flow rate measuring devices and at least one of results of measurement of the two second flow rate measuring devices change more than a predetermined threshold value to thereby determine that deposition of deposits in the separation membrane in the separation membrane device is in a deposition initial state, and further configured to carry out washing on the separation membrane in the separation membrane device by supplying the washing liquid from the washing liquid supplying unit to the separation membrane device and carry out a control for changing an operation condition of changing addition concentration of a deposit retarder being supplied to the water to be treated before introduction of the water to be treated into the separation membrane device on the basis of the determination result for the deposition initial state.

13. The water treatment device according to claim 12, wherein a length of a flow channel in the first deposit detecting unit is 1/10 or less of a total length in a supply liquid flow direction of the separation membrane being used in the separation membrane device.

14. The water treatment device according to claim 12, wherein a length of a flow channel in the second deposit detecting unit is 1/10 or less of a total length in a supply liquid flow direction of the separation membrane being used in the separation membrane device.

15. A water treatment device comprising:
a separation membrane device having a separation membrane for concentrating dissolved components and dispersed components from water to be treated and obtaining permeated water and non-permeated water;
a first deposit detecting unit provided in a non-permeated water branch line branched from the non-permeated water line for discharging non-permeated water in which dissolved components and dispersed components have been concentrated, using part of the non-permeated water that has branched off as a detection liquid, and having a first detector membrane in which the detection liquid is separated into permeated water for detection and non-permeated water for detection;
two first flow rate measuring devices that measure the flow rates of the permeated water for detection separated by the first detector membrane and the non-permeated water for detection separated by the first detector membrane; and
a control device configured to determine whether at least one of results of measurement of the two first flow rate measuring devices changes more than a predetermined threshold value to thereby determine that deposition of deposits in the separation membrane in the separation membrane device is in a deposition initial state, and further configured to carry out a control for changing an operation condition of changing addition concentration of a deposit retarder being supplied to the water to be treated before introduction of the water to be treated into the separation membrane device on the basis of the determination result for the deposition initial state.

16. The water treatment device according to claim 15, wherein a length of a flow channel in the first deposit detecting unit is 1/10 or less of a total length in a supply liquid flow direction of the separation membrane being used in the separation membrane device.

17. A water treatment device comprising:
a separation membrane device having a separation membrane for concentrating dissolved components and dispersed components from water to be treated and obtaining permeated water and non-permeated water;

a deposit detecting unit provided in a water to be treated branch line branched from a water to be treated supply line for supplying the water to be treated, using part of the water to be treated that has branched off as a detection liquid, and having a detector membrane in which the detection liquid is separated into permeated water for detection and non-permeated water for detection;

two flow rate measuring devices that measure the flow rates of one or both of the permeated water for detection and the non-permeated water for detection separated by the detector membrane; and a control device configured to determine whether at least one of results of measurement of the two flow rate measuring devices changes more than a predetermined threshold value to thereby determine that deposition of deposits in the separation membrane in the separation membrane device is in a deposition initial state, and further configured to carry out a control for changing an operation condition of changing addition concentration of a deposit retarder being supplied to the water to be treated before introduction of the water to be treated into the separation membrane device on the basis of the determination result for the deposition initial state.

18. The water treatment device according to claim 17, wherein a length of a flow channel in the deposit detecting unit is $1/10$ or less of a total length in a supply liquid flow direction of the separation membrane being used in the separation membrane device.

19. A water treatment device comprising:

a separation membrane device having a separation membrane for concentrating dissolved components and dispersed components from water to be treated and obtaining permeated water and non-permeated water;

a first deposit detecting unit provided in a non-permeated water branch line branched from a non-permeated water line for discharging non-permeated water in which dissolved components and dispersed components have been concentrated, using part of the non-permeated water that has branched off as a detection liquid, and having a first detector membrane in which the detection liquid is separated into permeated water for detection and non-permeated water for detection;

two first flow rate measuring devices that measure the flow rates of the permeated water for detection separated by the first detector membrane and the non-permeated water for detection separated by the first detector membrane;

a second deposit detecting unit provided in a water to be treated branch line branched from a water to be treated supply line for supplying the water to be treated, using part of the water to be treated that has branched off as a detection liquid, and having a second detector membrane in which the detection liquid is separated into permeated water for detection and non-permeated water for detection;

two second flow rate measuring devices that measure the flow rates of the permeated water for detection separated by the second detector membrane and the non-permeated water for detection separated by the second detector membrane; and a control device configured to determine whether at least one of results of measurement of the two first flow rate measuring devices and at least one of results of measurement of the two second flow rate measuring devices change more than a predetermined threshold value to thereby determine that deposition of deposits in the separation membrane in the separation membrane device is in a deposition initial state, and further configured to carry out a control for changing an operation condition of changing addition concentration of a deposit retarder being supplied to the water to be treated before introduction of the water to be treated into the separation membrane device, changing the supplied liquid flow rate of the water to be treated to the separation membrane device on the basis of the determination result for the deposition initial state.

20. The water treatment device according to claim 19, wherein a length of a flow channel in the first deposit detecting unit is $1/10$ or less of a total length in a supply liquid flow direction of the separation membrane being used in the separation membrane device.

21. The water treatment device according to claim 19, wherein a length of a flow channel in the second deposit detecting unit is $1/10$ or less of a total length in a supply liquid flow direction of the separation membrane being used in the separation membrane device.

* * * * *